United States Patent
Shinde et al.

(10) Patent No.: US 11,512,594 B2
(45) Date of Patent: Nov. 29, 2022

(54) SYSTEM AND METHOD FOR MODULATING AIRFLOW INTO A BORE OF A ROTOR TO CONTROL BLADE TIP CLEARANCE

(71) Applicant: General Electric Company, Schenectady, NY (US)

(72) Inventors: Kudum Shinde, Bangalore (IN); Ajit Kumar Verma, Bangalore (IN)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 16/893,546

(22) Filed: Jun. 5, 2020

(65) Prior Publication Data
US 2021/0381433 A1    Dec. 9, 2021

(51) Int. Cl.
*F01D 5/08*  (2006.01)
*F01D 11/24*  (2006.01)

(52) U.S. Cl.
CPC ............. *F01D 5/085* (2013.01); *F01D 11/24* (2013.01); *F05D 2220/32* (2013.01); *F05D 2240/63* (2013.01); *F05D 2270/64* (2013.01)

(58) Field of Classification Search
CPC .............. F05D 2240/63; F01D 11/24; F01D 5/081–087
See application file for complete search history.

(56) References Cited

U.S. PATENT DOCUMENTS

| | | | | |
|---|---|---|---|---|
| 2,811,833 A | * | 11/1957 | Broffitt | F01D 5/081 60/806 |
| 3,575,528 A | * | 4/1971 | Beam, Jr. | F01D 5/08 416/39 |
| 3,702,121 A | | 11/1972 | Millman | |
| 3,712,756 A | * | 1/1973 | Kalikow | F01D 5/08 137/56 |
| 4,296,599 A | * | 10/1981 | Adamson | F02C 7/18 415/115 |
| 4,416,111 A | * | 11/1983 | Lenahan | F02C 7/18 60/795 |
| 4,462,204 A | * | 7/1984 | Hull | F01D 25/12 60/806 |
| 4,645,416 A | * | 2/1987 | Weiner | F01D 11/24 415/115 |
| 4,708,588 A | * | 11/1987 | Schwarz | F02C 7/18 415/115 |
| 4,805,398 A | * | 2/1989 | Jourdain | F02C 7/18 60/806 |

(Continued)

FOREIGN PATENT DOCUMENTS

FR   3108658 A1 * 10/2021
FR   3108659 A1 * 10/2021
(Continued)

*Primary Examiner* — Topaz L. Elliott
(74) *Attorney, Agent, or Firm* — Dority & Manning, P.A.

(57) ABSTRACT

A system for modulating airflow into a bore defined by a rotor of a gas turbine engine defining an axial direction, a circumferential direction, and a radial direction is provided. The system includes a movable member positioned forward of a first stage of rotor blades of the rotor. The movable member is movable between at least a first position and a second position to modulate airflow into the bore via a plurality of opening in fluid communication with the bore.

19 Claims, 18 Drawing Sheets

(56) References Cited

U.S. PATENT DOCUMENTS

| | | | |
|---|---|---|---|
| 4,807,433 A * | 2/1989 | Maclin | F02C 7/18 60/795 |
| 4,893,984 A * | 1/1990 | Davison | F01D 11/24 415/116 |
| 5,012,420 A | 4/1991 | Walker et al. | |
| 5,575,616 A * | 11/1996 | Hagle | F01D 5/081 415/115 |
| 5,865,398 A | 2/1999 | Pashea et al. | |
| 6,050,079 A * | 4/2000 | Durgin | F01D 5/082 415/115 |
| 6,779,967 B2 * | 8/2004 | Friedl | F02C 7/12 415/26 |
| 6,931,859 B2 * | 8/2005 | Morgan | F01D 17/141 137/494 |
| 7,258,524 B2 * | 8/2007 | Friedel | F04D 27/0215 415/111 |
| 7,430,852 B2 | 10/2008 | Beutin et al. | |
| 8,292,571 B2 | 10/2012 | Ballard, Jr. et al. | |
| 8,882,453 B2 * | 11/2014 | Rousselin | F02C 7/28 415/173.7 |
| 9,297,310 B2 | 3/2016 | Giri et al. | |
| 9,316,152 B2 * | 4/2016 | Subbareddyar | F02C 7/18 |
| 9,429,071 B2 | 8/2016 | Quackenbush et al. | |
| 9,719,424 B2 | 8/2017 | Teia Dos Santos Mendes Gomes | |
| 9,890,645 B2 | 2/2018 | McCaffrey et al. | |
| 10,094,296 B2 | 10/2018 | Schwarz et al. | |
| 10,107,206 B2 | 10/2018 | Forcier et al. | |
| 10,337,739 B2 * | 7/2019 | Widener | F23N 5/047 |
| 10,712,007 B2 * | 7/2020 | Widener | F23R 3/26 |
| 10,947,993 B2 * | 3/2021 | Shinde | F01D 25/14 |
| 2005/0132711 A1 * | 6/2005 | Morgan | F02C 7/18 60/772 |
| 2006/0239812 A1 * | 10/2006 | Friedel | F01D 17/105 415/115 |
| 2009/0226327 A1 * | 9/2009 | Little | F01D 5/082 416/96 A |
| 2009/0266079 A1 * | 10/2009 | Donnelly | F23R 3/10 60/737 |
| 2011/0188992 A1 * | 8/2011 | Fintescu | F02C 7/06 415/107 |
| 2011/0311349 A1 * | 12/2011 | Rousselin | F02C 7/28 415/115 |
| 2016/0097296 A1 * | 4/2016 | Ballard, Jr. | F01D 11/24 415/1 |
| 2016/0123176 A1 | 5/2016 | Ackermann et al. | |
| 2017/0074112 A1 | 3/2017 | Philbrick et al. | |
| 2017/0321564 A1 | 11/2017 | Bunker et al. | |
| 2018/0051882 A1 * | 2/2018 | Widener | F02C 9/18 |
| 2018/0202361 A1 * | 7/2018 | Sadler | F02C 7/18 |
| 2018/0216827 A1 * | 8/2018 | Widener | F02C 3/04 |
| 2018/0355748 A1 * | 12/2018 | Delaitre | F02K 3/06 |
| 2019/0078466 A1 | 3/2019 | Nolcheff | |

FOREIGN PATENT DOCUMENTS

| | | |
|---|---|---|
| GB | 2564935 A | 1/2019 |
| WO | WO-2021191523 A1 * | 9/2021 |

* cited by examiner

SYSTEM AND METHOD FOR MODULATING AIRFLOW INTO A BORE OF A ROTOR TO CONTROL BLADE TIP CLEARANCE

FIELD OF THE INVENTION

The present subject matter relates generally to a gas turbine engine and, more particularly, to blade tip clearances for a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stator vanes that are stationary. The high pressure compressor further includes a rotor that includes multiple annular arrays of rotor blades. Collectively one row of compressor vanes and one row of rotor blades make up a "stage" of the compressor. Typically, the high pressure compressor includes a plurality of successive stages.

The stator vanes and rotor blades are surrounded by a stationary shroud or casing. In order to maintain engine efficiency, it is desirable to minimize a clearance gap defined between the tips of the rotor blades and the stationary shroud. During operation of a gas turbine engine implemented on an aerial vehicle, numerous transient conditions can occur that affect rotor speed and temperature. For example, during takeoff, high rotor speeds and temperature can cause radial deflection of the rotor blades to increase and thereby reduce the clearance gap such that the tip of the rotor blades contact (e.g., rub) the stationary shroud or casing.

It is desirable to avoid instances of rubbing and related shortcomings associated with variable clearances between a blade and shroud or casing during operation of a gas turbine engine.

BRIEF DESCRIPTION OF THE INVENTION

Aspects and advantages of the invention will be set forth in part in the following description, or may be obvious from the description, or may be learned through practice of the invention.

In one aspect, a system for modulating airflow into a bore defined by a rotor of a gas turbine engine defining an axial direction, a circumferential direction, and a radial direction is provided. The system includes a movable member positioned forward of a first stage of rotor blades of the rotor. The movable member is movable between at least a first position and a second position to modulate airflow into the bore via a plurality of opening in fluid communication with the bore.

In another aspect, a method for modulating airflow into a bore of a rotor of a gas turbine engine is provided. The method includes obtaining, by one or more processors, data indicative of one or more parameters associated with operation of the gas turbine engine or an environment in which the gas turbine engine is operating. The method further includes determining, by the one or more processors, a movable member movable between at least a first position and a second position to modulate airflow into the bore of the rotor needs to move from a current position to an adjusted position based, at least in part, on the data. Furthermore, the method includes providing, by the one or more processors, one or more control signals associated with controlling operation of the movable member such that the movable member moves from the current position to the adjusted position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
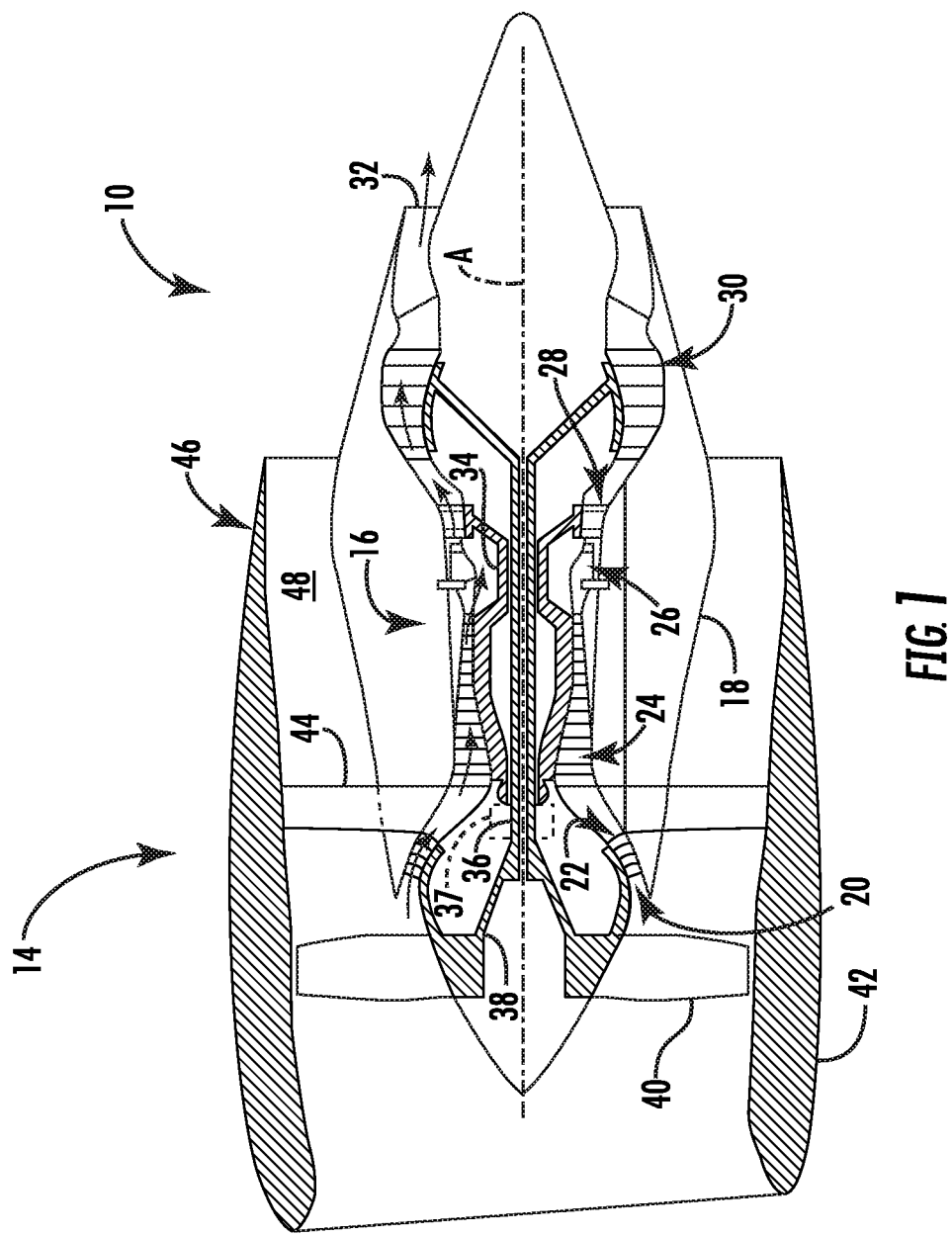
FIG. 1 depicts a schematic cross-sectional view of a gas turbine engine according to example embodiments of the present disclosure.

Repeat use of reference characters in the present specification and drawings is intended to represent the same or analogous features or elements of the present invention.

DETAILED DESCRIPTION OF THE INVENTION

Typical high pressure compressors of gas turbine engines can include a plurality of openings in fluid communication with an interior (e.g., bore) of the rotor to allow air to flow into the interior of the rotor. However, since the plurality of openings have a fixed cross-sectional area, parameters associated with the air flowing into the interior of the rotor via the plurality of openings cannot be adjusted. In particular, the mass flow rate of the air cannot be adjusted due to the fixed cross-sectional area of the plurality of openings. The following disclosure includes a system that allows for modulation of air flowing into an interior of a rotor via the plurality of openings.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems for modulating airflow into a bore of a rotor of a gas turbine engine. For instance, in some implementations, the systems according to the present disclosure can be used to modulate airflow into the bore of the rotor associated with a high pressure compressor of the gas turbine.

In some implementations, systems according to the present disclosure can include a movable member positioned forward of a plurality of openings in fluid communication with the bore of the rotor. Furthermore, the movable member can be movable between at least a first position and a second position to modulate airflow into the bore of the rotor. For instance, air can flow into the bore via the openings at a first mass flow rate when the movable member is in the first position. Conversely, air can flow into the bore via the openings at a second mass flow rate that is different than the first mass flow rate when the movable member is in the second position. In this manner, the movable member can be used to adjust the mass flow rate of air flowing into the bore of the rotor via the plurality of openings to adjust a clearance gap defined between a blade tip of rotor blades of the rotor and an outer casing.

It should be understood that the movable member can be any device operable to modulate airflow into the bore of the rotor.

In some implementations, the movable member can be a damper movable between at least the first position and the second position to selectively cover at least a portion of the openings in fluid communication with the bore of the rotor to modulate the mass flow rate of air flowing into the bore via the openings In some implementations, the movable member can include a plurality of flaps.

In some implementations, the plurality of flaps can be circumferentially spaced from one another and rotatable between at least the first position and the second position to selectively cover at least a portion of a corresponding opening of the plurality of openings in fluid communication with the bore of the rotor. Furthermore, in some implementations, the system can include a plurality of actuators configured to rotate a corresponding flap of the plurality of flaps between at least the first position and the second position to modulate airflow into the bore of the rotor via a corresponding opening of the plurality of openings in fluid communication with the bore of the rotor.

In some implementations, the movable member can include a sleeve coupled rotatable about a circumferential direction between at least the first position and the second position to selectively modulate airflow into the bore of the rotor via the plurality of openings in fluid communication with the bore of the rotor. In alternative implementations, the sleeve can be movable along an axial direction between at least the first position and the second position to selectively modulate airflow into the bore of the rotor via the openings.

In some implementations, the movable member can cover at least a portion of the plurality of openings in fluid communication with the bore of the rotor when the movable member is in the first position. In this manner, air can flow into the bore of the rotor via the plurality of openings at a first mass flow rate when the sleeve is in the first position. Conversely, when the movable member is in the second position, each of the plurality of openings defined by the movable member can be aligned with a corresponding opening of the plurality of openings in fluid communication with the bore of the rotor. In this manner, air can flow into the bore of the rotor at a second mass flow rate that is different than the first mass flow rate when the movable member is in the second position.

In some implementations, the system can include heating/cooling circuit configured to adjust (e.g., increase or decrease) a temperature of the air flowing into the bore of the rotor via the plurality of openings. For instance, the heating/cooling circuit can be configured to heat air before the air flows into the bore of the rotor. In this manner, the heated air flowing into the bore of the rotor can cause radial deflection of the rotor blades to increase and thereby reduce the clearance gap defined between the outer casing and the blade tip of the rotor blades. Alternatively, the heating/cooling circuit can be configured to cool air before the air flows into the bore of the rotor. In this manner, the cooled air flowing into the bore of the rotor can cause the radial deflection of the rotor blades to decrease and thereby increase the clearance gap defined between the casing and the blade tip of the rotor blades.

In some implementations, the movable member can, as discussed above, be a valve positioned forward of the rotor. In such implementations, the valve can be operated in conjunction with the heating/cooling circuit to modulate the heated air or cooled air flowing into the bore of the rotor via the plurality of openings.

In some implementations, the system can include a controller configured to control operation of the movable member. For instance, the controller can be configured to obtain data indicative of operation of the gas turbine engine, an environment in which the gas turbine is operating, or both.

The controller can be further configured to control operation of the movable member based, at least in part, on the data to adjust (e.g., increase or decrease) the clearance gap defined between the plurality of rotor blades and the casing surrounding the blade tip of the rotor blades. More specifically, the controller can control operation of the movable member to increase or decrease the mass flow rate of air flowing into the bore of the rotor via the plurality of openings to increase or decrease the clearance gap as needed.

The system according to the present disclosure can provide numerous technical benefits. For instance, systems according to the present disclosure can be used on gas turbine engines, particularly a rotor of a high pressure compressor of gas turbine engines, to actively adjust a mass flow rate of air flowing into the bore of the rotor to cool or heat the bore as needed to maintain a desired clearance gap between the blade tip of the rotor blades and the outer casing of the rotor. Furthermore, the system can, as discussed above, include a heating circuit configured to adjust (e.g., increase) a temperature of the air flowing into the bore via the plurality of openings to maintain the desired clearance gap. In this manner, tighter clearances between the blade tip of the rotor blades and the outer casing can be maintained and thereby improve specific fuel consumption (SFC) of gas turbine engines.

It should be appreciated that modulating the airflow into the bore of the rotor can affect downstream seal flows and temperatures. In this manner, parameters (e.g., temperature) associated with one or more components of the gas turbine engine that are aft (e.g., downstream) of the rotor can be affected due, at least in part, to modulating airflow into the bore of the rotor. For instance, a temperature of one or more stages of blades of the turbine can be adjusted (e.g., cooled or heated) based, at least in part, on modulating the airflow into the bore of the rotor. In this manner, the system according to the present disclosure can be used to maintain a desired clearance gap between the shroud and the one or more stages of the rotor blades.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Still further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between a center longitudinal axis of the engine and an outer engine circumference.

Referring now to the FIGS., FIG. 1 depicts a high-bypass turbofan type engine 10 (hereinafter, referred to as "turbofan 10") according to the present disclosure. As shown, the turbofan 10 defines a longitudinal or axial centerline axis A that extends therethrough for reference purposes. The turbofan 10 can include a fan section 14 and a core turbine or gas turbine engine 16 disposed downstream from the fan section 14.

The gas turbine engine 16 can generally include a substantially tubular outer casing 18 that defines an annular inlet 20. It should be understood that, in some implementations, the outer casing 18 can formed from multiple casings. The outer casing 18 can encase, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 can also be connected to a shaft or fan spool 38 of the fan section 14. In some implementations, the LP spool 36 can be connected to the fan spool 38 via a speed reduction device 37 (depicted in phantom), such as a reduction gear gearbox in an indirect-drive or geared-drive configuration. Such speed reduction devices can be included between any suitable shafts/spools within the turbofan 10 as desired or required.

The fan section 14 of the turbofan 10 can include a plurality of fan blades 40 coupled to the fan spool 38. Each of the plurality of fan blades 40 can extend radially outwardly from the fan spool 38. An annular fan casing or nacelle 42 can circumferentially surround the fan section 14 and/or at least a portion of the gas turbine engine 16. It should be appreciated by those of ordinary skill in the art that the nacelle 42 can be configured to be supported relative to the gas turbine engine 16 by a plurality of circumferentially-spaced outlet guide vanes 44. Moreover, a downstream section 46 of the nacelle 42 (downstream of the guide vanes 44) can extend over an outer portion of the gas turbine engine 16 so as to define a bypass airflow passage 48 therebetween.

Figure 2:
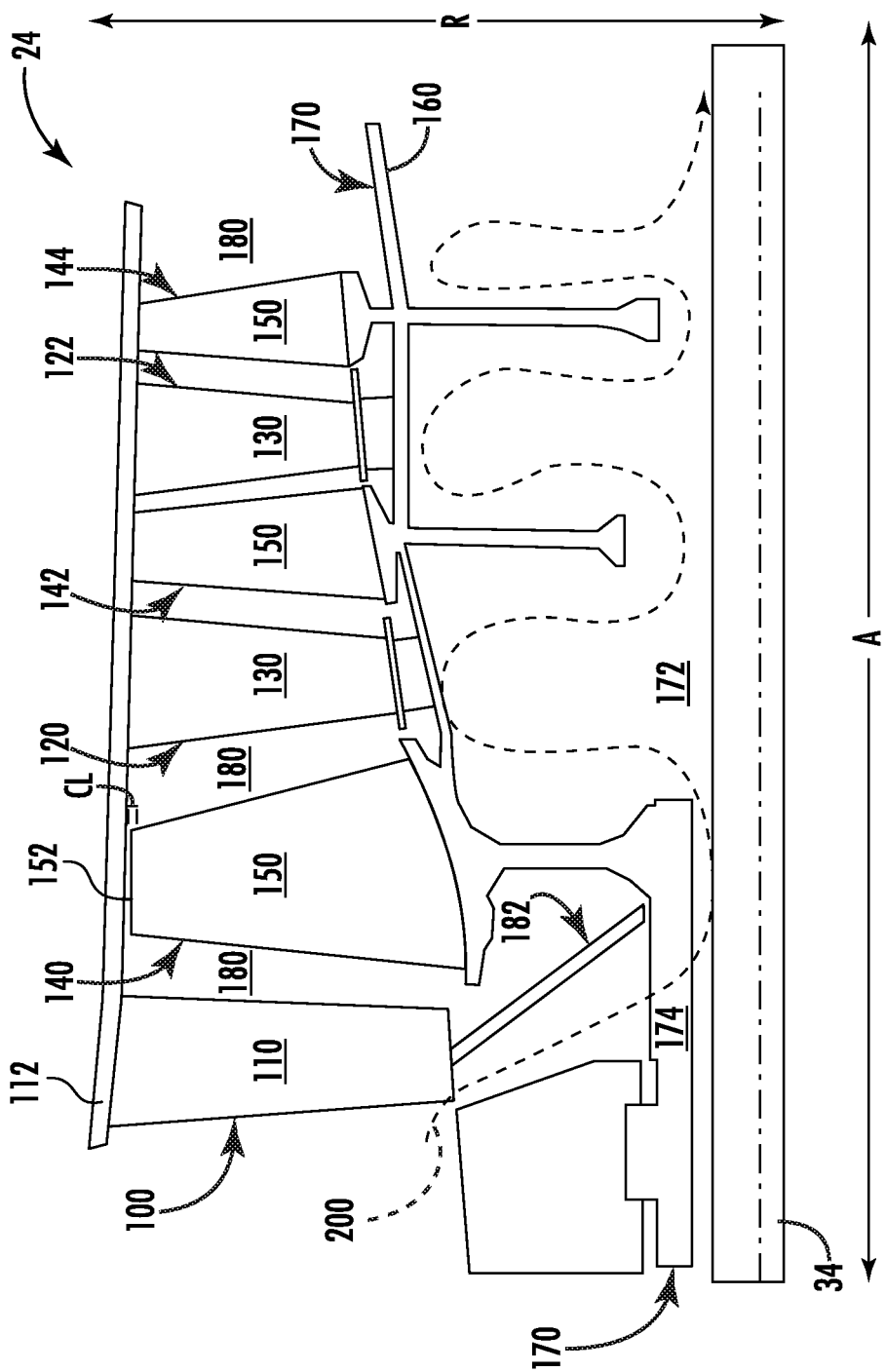
FIG. 2 depicts an enlarged cross-sectional side view of a high pressure compressor of a gas turbine engine according to example embodiments of the present disclosure.
Figure 3:
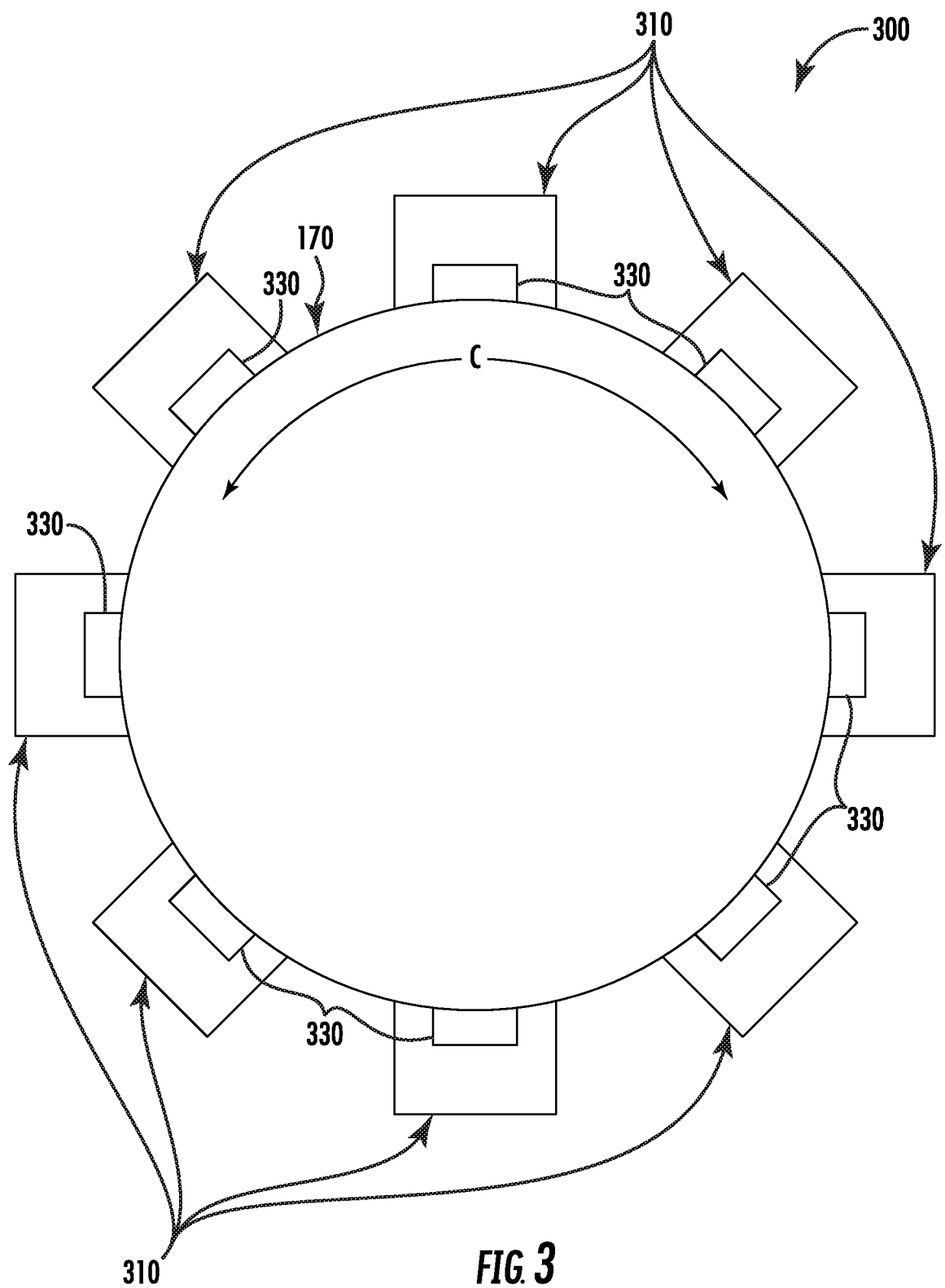
FIG. 3 depicts a system for modulating airflow into a bore of a rotor of a gas turbine engine according to example embodiments of the present disclosure.

Referring now to FIG. 2, an enlarged cross-sectional view of the HP compressor 24 (FIG. 1) is provided according to example embodiments of the present disclosure. In some implementations, the HP compressor 24 can include an annular array 100 of inlet guide vanes 110 (only one shown). As shown, the inlet guide vanes 110 can extend from a casing 112 associated with the HP compressor 24. Furthermore, the HP compressor 24 can include multiple stages of vanes or stators positioned downstream of the annular array 100 of inlet guide vanes 110. For instance, the HP compressor 24 can include, in serial flow relationship, a first stage 120 of stators 130 (only one shown) and a second stage 122 of stators 130 (only one shown) spaced apart from the first annular array along the axial direction A. It should be understood that individual stators 130 of stage 120 (likewise with stators 130 of stage 122) can extend from the casing 112 and are circumferentially spaced from one another. It should also be understood that the HP compressor 24 can include any suitable number of stages of vanes or stators 130.

The HP compressor 24 can include a first stage 140 of rotor blades 150 positioned along the axial direction A between the annular array 100 of inlet guide vanes 110 and the first stage 120 of stators 130. The HP compressor 24 can further include a second stage 142 of rotor blades 150 positioned along the axial direction A between the first stage 120 of stators 130 and the second stage 122 of stators 130. Still further, the HP compressor 24 can, in some implementations, include a third stage 144 of rotor blades 150 positioned aft of the second stage 122 of stators 130. It should be understood that the rotor blades 150 of each stage are circumferentially spaced from one another. It should also be understood that the HP compressor 24 can include any suitable number of stages of rotor blades 150.

As shown, the first stage 140 of rotor blades 150, the second stage 142 of rotor blades 150, and the third stage 144 of rotor blades 150 are coupled to a frame 160 to collectively define a rotor 170 of the HP compressor 24. As shown, the casing 112 and the rotor 170 can at least partially define a path 180 through the HP compressor 24. In this manner, air exiting the LP compressor 22 (FIG. 1) can flow through the path 180. As shown, the rotor blades 150 and vanes or stators 132 are positioned at least partially within the path 180. In some implementations, the casing 112 can include one or more shroud assemblies, each of which forms an annular ring around the rotor blades 150. For example, the casing 112 can include a first shroud assembly (not shown) forming an annular ring around the annular array of rotor blades 150 of the first stage 120, a second shroud assembly forming an annular ring around the annular array of rotor blades 150 of the second stage 142, and a third shroud assembly forming an annular ring around the annular array of rotor blades 50 of the third stage 144. Each of the shroud assemblies (e.g., first shroud assembly, second shroud assembly, third shroud assembly) can generally include a plurality of shrouds and associated hangers (not shown). In general, the shrouds of the shroud assemblies are radially spaced from the blade tip 152 of each rotor blade 150. A radial or clearance gap CL is defined between a blade tip 152 and the casing 112. The shrouds and shroud assemblies of the casing 112 generally reduce leakage within the path 180. It should be appreciated that although not numbered the casing 112 further includes additional features and components not described herein. For example, the casing 112 can further include shroud supports, seals, and other structural components. As will be discussed below in more detail, air 200 can be diverted into a bore or cavity 172 defined by the rotor 170 to heat or cool the rotor 170. It should be understood that heating or cooling the rotor 170 can affect the radial or clearance gap CL defined between the blade tip 152 and the casing 112. In this manner, air can be diverted into the cavity 172 defined by the rotor 170 to adjust the clearance or radial gap CL as needed.

In some implementations, the HP compressor 24 can include a diverter 182 coupled between the inlet guide vanes 110 and the frame 160. As shown, the diverter 182 can be configured to divert air 200 into the cavity 172 defined by the rotor 170. More specifically, the air 200 can be diverted into the cavity 172 via a plurality of inlets or openings 174 defined by the rotor 170 and in fluid communication with the cavity 172. As shown, the plurality of openings 174 can be positioned forward of the first stage 140 of rotor blades 150 along the axial direction A. In some implementations, the plurality of openings 174 can be circumferentially spaced from one another.

It should be understood that the air 200 can be provided from any suitable source. For instance, in some implementations, the air 200 can include a portion of air exiting the LP compressor 22 (FIG. 1) of the gas turbine engine 16. As will be discussed below in more detail, the present disclosure is directed to systems for modulating the flow of air 200 into the cavity 172 via the plurality of openings 174. In this manner, systems according to the present disclosure can be used to control the clearance or radial gap CL between the casing 112 and the blade tip 152 of each rotor blade 150.

Referring now to FIGS. 3 through 8, a system 300 for modulating airflow into the cavity 172 (FIG. 2) of the rotor 170 is provided according to example embodiments of the present disclosure. The system 300 includes a movable member 310 positioned forward of the first stage 140 (FIG. 2) of rotor blades 150 of the rotor 170 along the axial direction A. As will be discussed below in more detail, the movable member 310 can be movable between at least a first position and a second position to modulate airflow into the cavity 172 of the rotor 170 via the plurality of openings 174 (FIG. 2).

It should be appreciated that the movable member 310 can include any suitable device operable to modulate airflow into the cavity 172 of the rotor 170. For instance, in some implementations, the movable member 310 can be a valve movable between at least the first position and the second position to modulate airflow into the cavity 172. Alternatively, the movable member 310 can be a damper movable between at least the first position and the second position.

As shown, the movable member 310 can in some implementations, include a plurality of flaps.

In some implementations, the plurality of flaps can be spaced apart from one another along a circumferential direction C. Furthermore, each of the plurality of flaps can be rotatable between at least the first position (FIGS. 4 and 6) and the second position (FIGS. 5 and 7) to selectively cover at least a portion of the plurality of openings 174.

Figure 4:
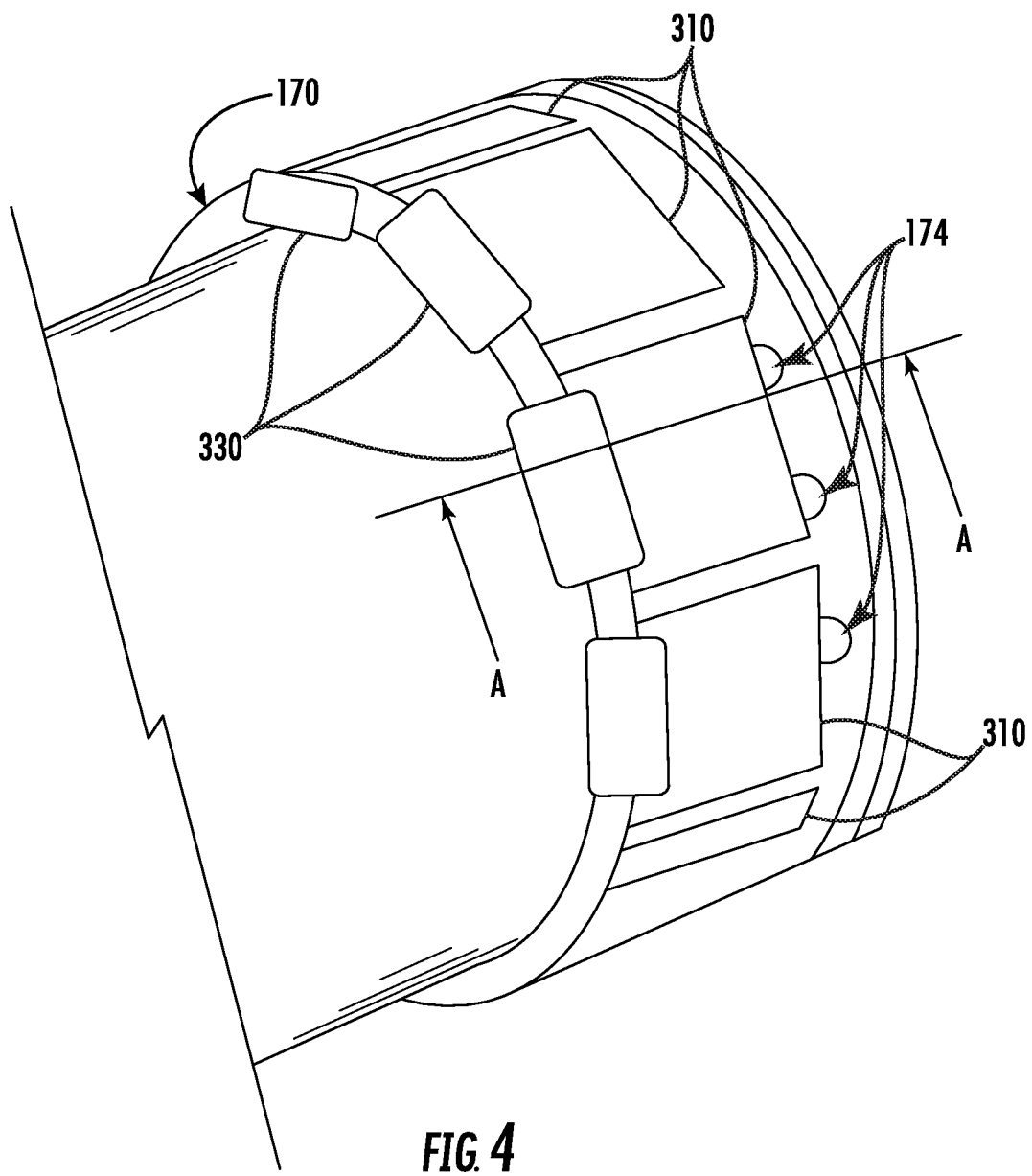
FIG. 4 depicts a movable member of the system of FIG. 3 in a first position according to example embodiments of the present disclosure.
Figure 5:
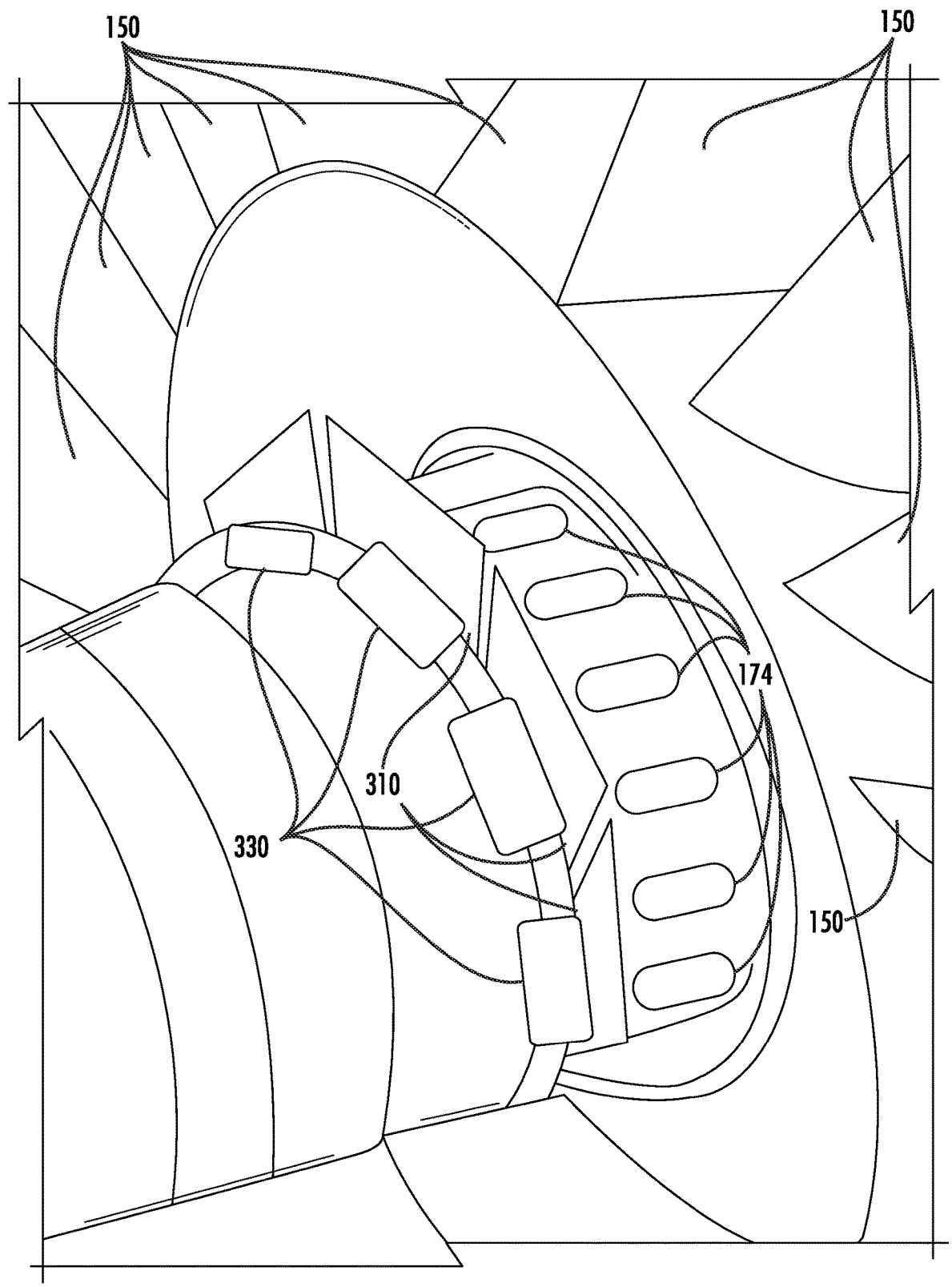
FIG. 5 depicts a movable member of the system of FIG. 3 in a second position according to example embodiments of the present disclosure.
Figure 6:
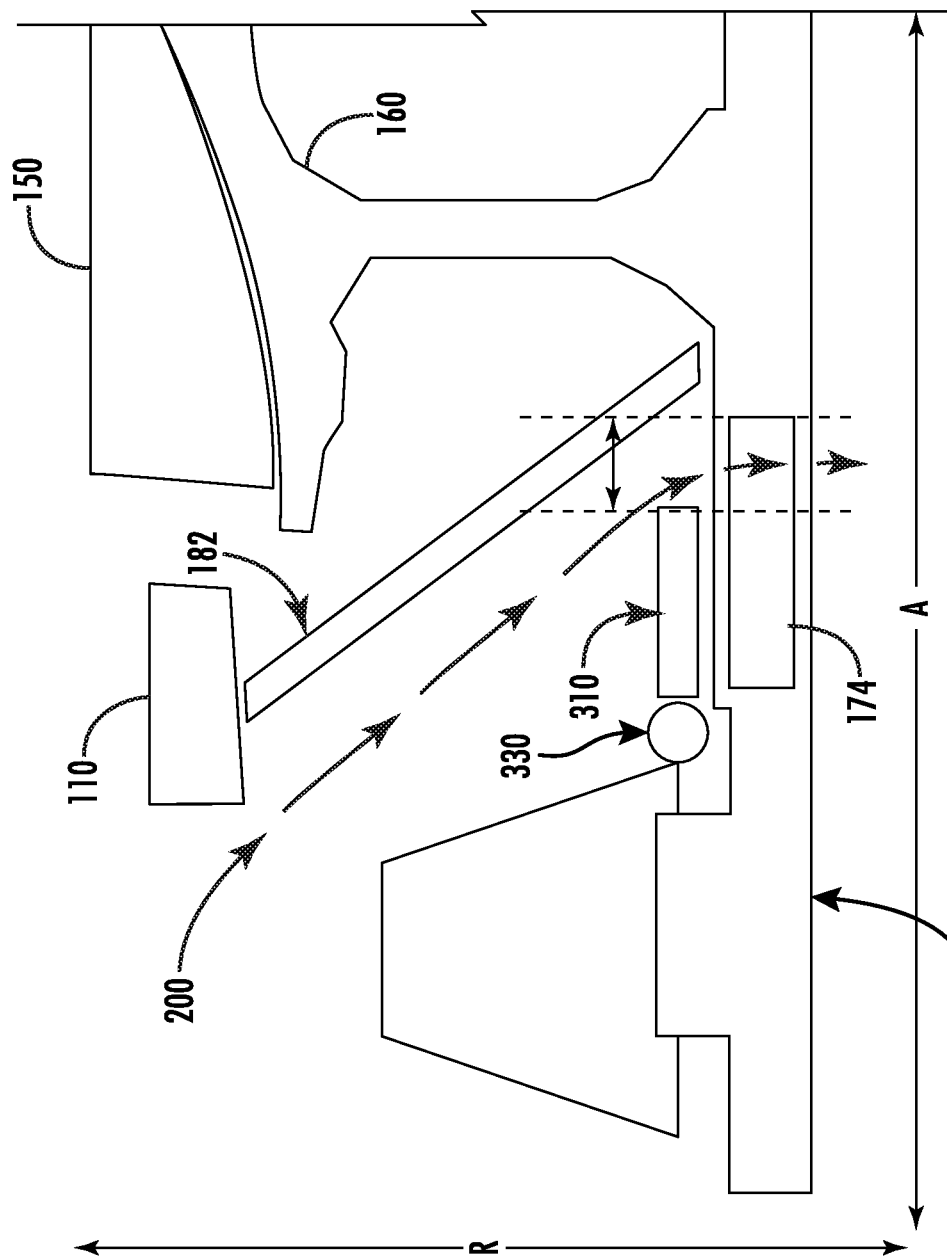
FIG. 6 depicts another view of the movable member of the system of FIG. 3 in a first position according to example embodiments of the present disclosure.

As shown, a flap of the plurality of flaps is oriented in a first plane (FIG. 6) when the flap is in the first position (FIGS. 4 and 6). In some implementations, the flap can be spaced apart from a corresponding opening of the plurality of openings 174 when the flap is in the first position. Alternatively or additionally, the flap can, as shown, cover a portion of the corresponding opening when the flap is in the first position. It should be appreciated that a surface area of the corresponding opening through which air must flow to enter the cavity 172 of the rotor 170 is reduced when the flap is in the first position. As such, air can flow through the corresponding opening of the plurality of openings 174 at a first mass flow rate when the flap is in the first position. As will be discussed below in more detail, the flap can move to the second position (FIGS. 5 and 7) to adjust the mass flow rate of the air flowing through the corresponding opening to adjust the clearance or radial gap CL defined between the casing 112 (FIG. 2) and the blade tip 152 (FIG. 2) of each rotor blade 150 (FIG. 2) of the rotor 170.

When the flap is in the second position (FIGS. 5 and 7), the flap can be oriented in a second plane (FIG. 7) that is different than the first plane (FIG. 6). For example, in some implementations, the second plane can be substantially perpendicular to the first plane. As shown, the flap no longer covers a portion of the corresponding opening when the flap is in the second position. Furthermore, since the flap no longer covers a portion of the corresponding opening, air can flow through the corresponding opening at a second mass flow rate that is different than the first mass flow rate. In this manner, one or more of the plurality of flaps can move from the first position to the second position and vice versa to vary the mass flow rate of air flowing into the cavity 172 of the rotor 170 via the plurality of openings 174 to adjust the clearance or radial gap CL defined between the casing 112 and the blade tip 152 of each rotor blade 150 of the rotor 170 as needed.

Figure 7:
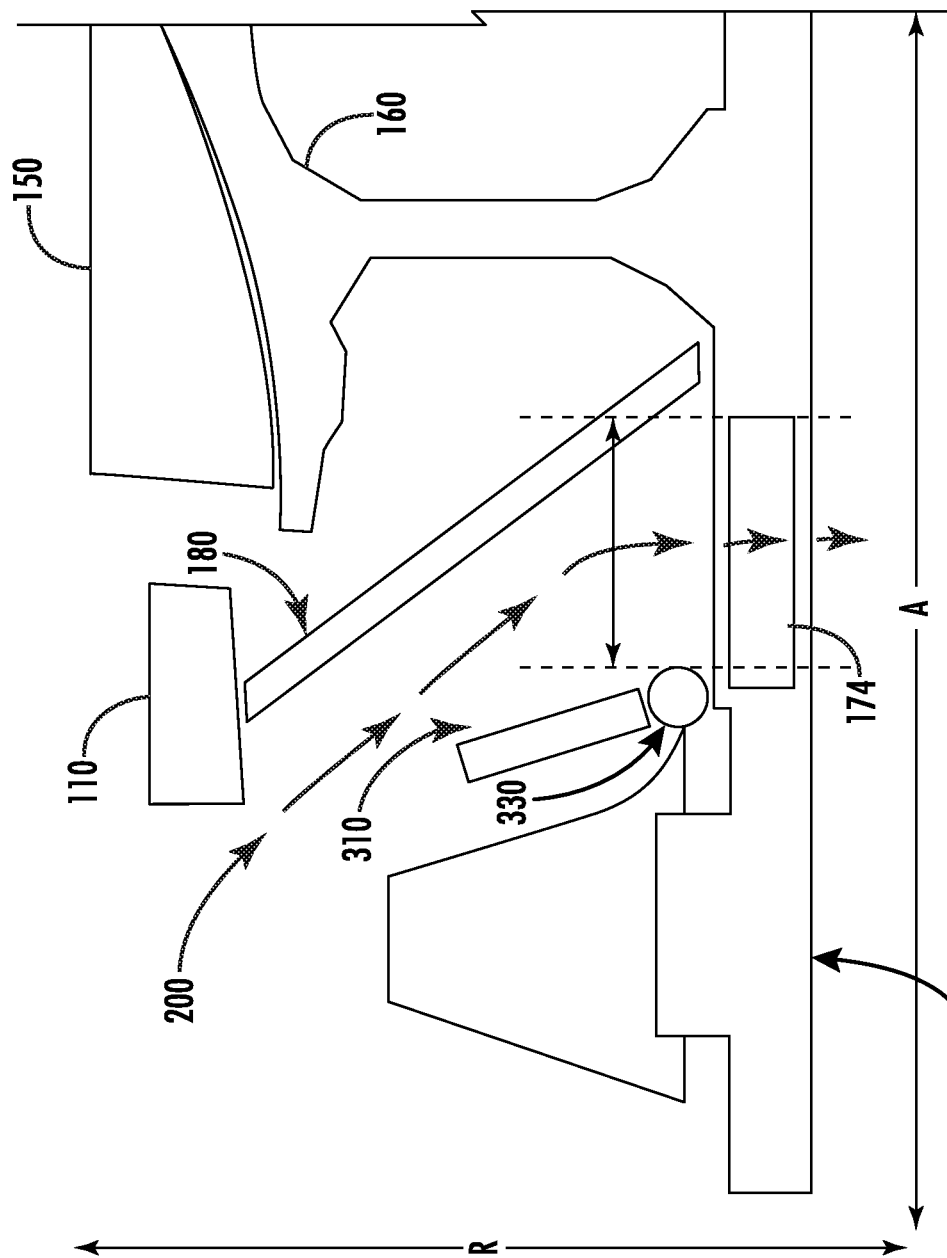
FIG. 7 depicts another view of the movable member of system of FIG. 3 in a second position according to example embodiments of the present disclosure.
Figure 8:
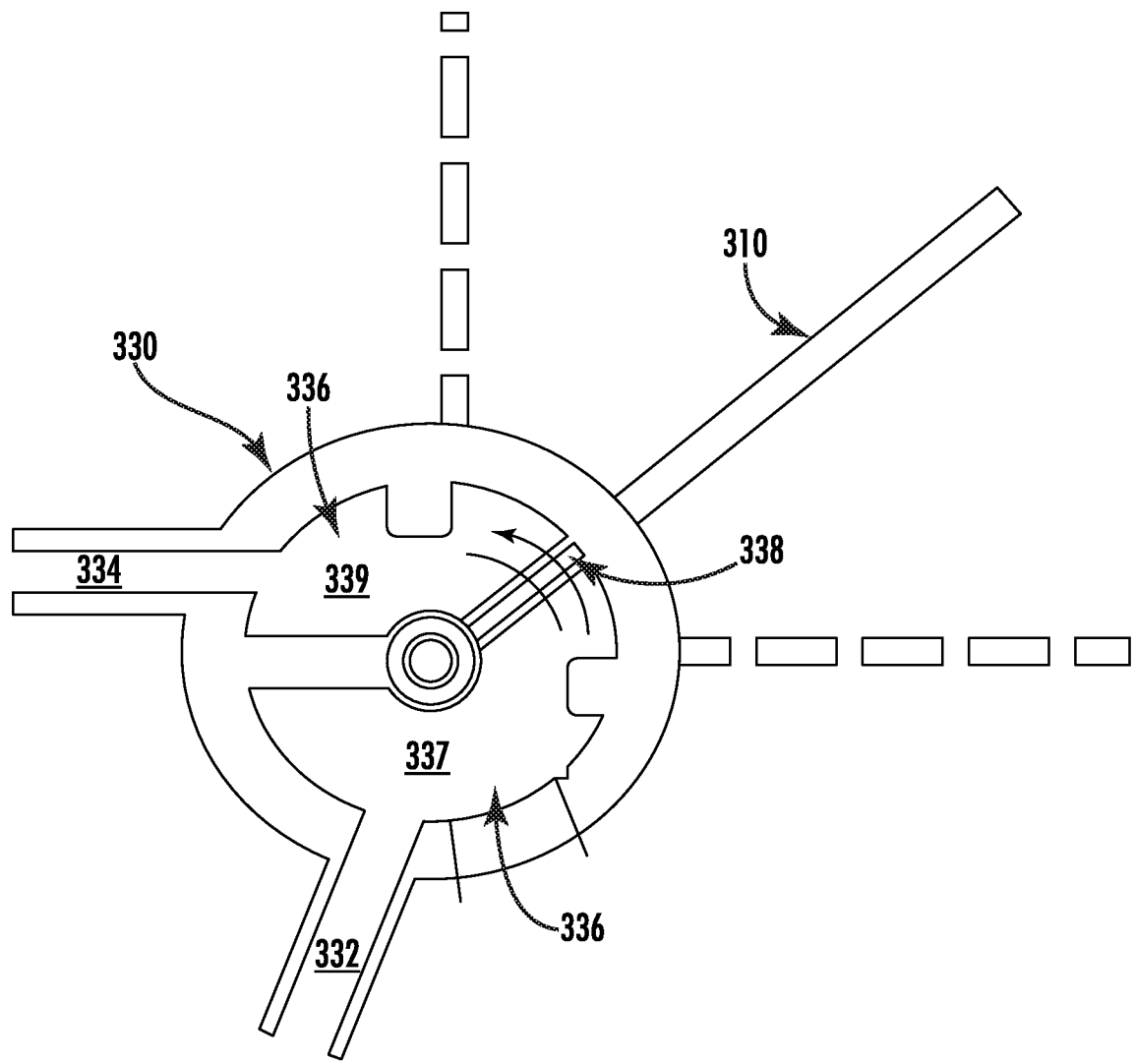
FIG. 8 depicts a cross-sectional view of an actuator of the system of FIG. 3 according to example embodiments of the present disclosure.
Figure 9:
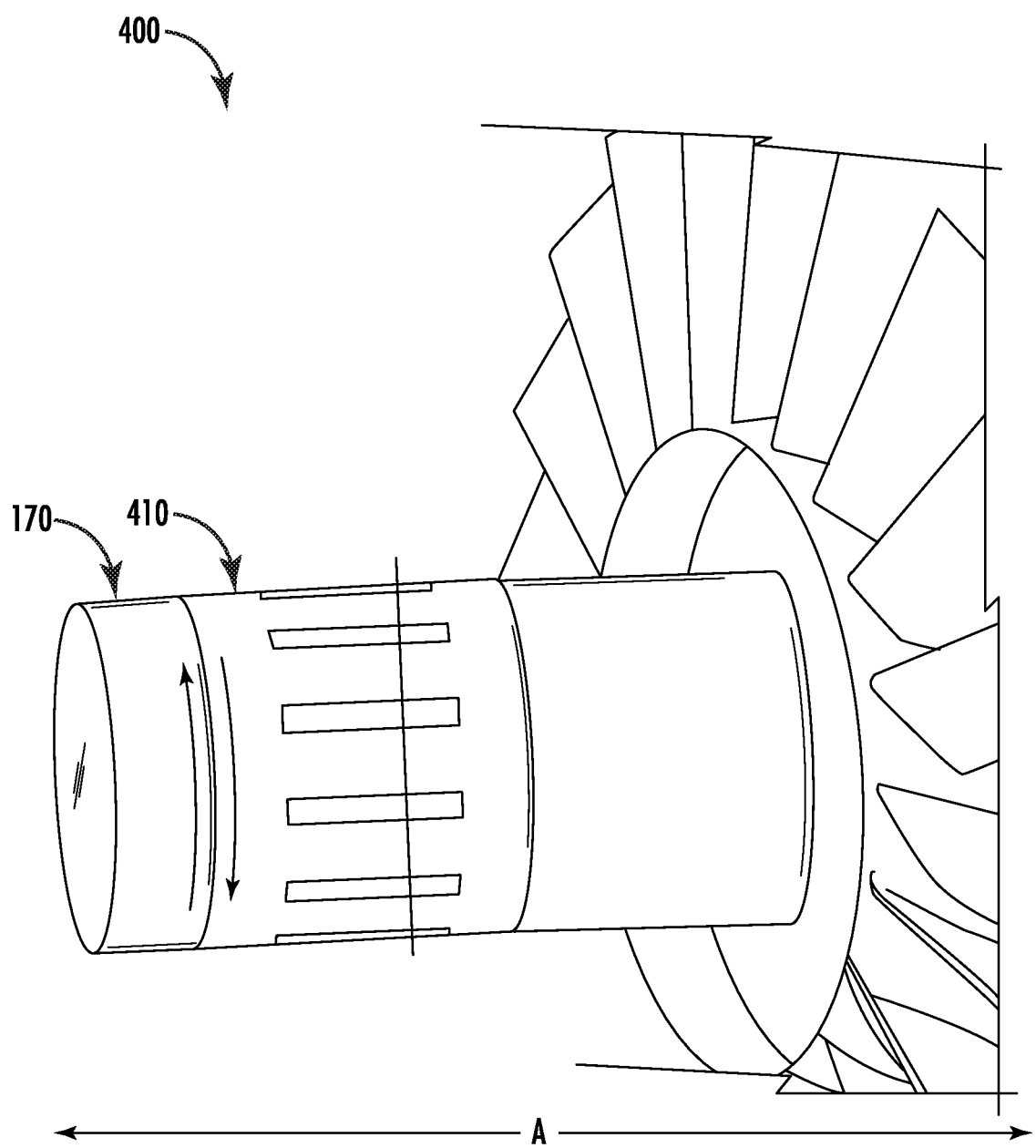
FIG. 9 depicts another system for modulating airflow into a bore of a rotor of a gas turbine engine according to example embodiments of the present disclosure.

In some implementations, the system 300 can include a plurality of actuators 330. As shown, each of the plurality of actuators 330 can be coupled to a corresponding flap of the plurality of flaps. Each of the plurality of actuators 330 can be configured to move the corresponding flap of the plurality of flaps between at least the first position (FIG. 4) and the second position (FIGS. 5 and 7). More specifically, each of the plurality of actuators 330 can be a rotary actuator configured to rotate the corresponding flap between at least the first position and the second position.

In some implementations, an actuator of the plurality of actuators 330 can be fluidly coupled to a hydraulic pump (not shown). For instance, the actuator can be coupled to the hydraulic pump via a first conduit 332 and a second conduit 334. As shown, an interior 336 of the actuator can be divided into a first portion 337 and a second portion 339. The first conduit 332 can be in fluid communication with the first portion 337 of the interior 336. Conversely, the second conduit 334 can be in fluid communication with the second portion 339 of the interior 336. When the hydraulic pump provides a flow of fluid (e.g., oil) to the interior 336 of the actuator via the first conduit 332, a shaft 338 positioned within the interior 336 of the actuator and coupled to a corresponding flap of the plurality of flaps (e.g., movable member 310) moves the corresponding flap to or towards the second position (FIGS. 5 and 7). It should be appreciated that the fluid within the second portion 339 of the interior 336 flows out of the interior 336 via the second conduit 334 when the hydraulic pump provides the fluid to the first portion 337 of the interior 336. Conversely, the hydraulic pump can provide the fluid to the second portion 339 of the interior 336 via the second conduit 334 to cause the shaft 338 to move the corresponding flap to or towards the first position (FIGS. 4 and 6).

Although the actuator discussed above is a mechanical actuator, it should be appreciated that any suitable type of actuator configured to move a corresponding flap of the plurality of flaps between at least the first position and the second position can be used. For instance, in some implementations, the actuator can be an electric motor.

Referring now to FIGS. 9 through 12, another embodiment of a system 400 for modulating airflow into the cavity 172 (FIG. 2) of the rotor 170 is provided according to example embodiments of the present disclosure. The system 400 can include a movable member 410. As shown, the movable member 410 can be a sleeve defining a plurality of openings 412. As will be discussed below in more detail, the movable member 410 can be movable along a circumferential direction C between at least a first position (FIGS. 9 and 11) and a second position (FIGS. 10 and 12) to modulate airflow into the cavity 172 (FIG. 2) of the rotor 170 via the plurality of openings 174.

As shown, in some implementations, the movable member 410 can cover a portion of the each of the plurality of openings 174 when the movable member 410 is in the first position. In this manner, a surface area of each of the plurality of openings 174 through which air 200 flows to enter the cavity 172 of the rotor 170 is reduced when the sleeve is in the first position. As such, air 200 can flow through each of the plurality of openings 174 at a first mass flow rate when the movable member 410 is in the first position. As will be discussed below in more detail, the movable member 410 can move to at least the second position (FIGS. 10 and 12) to adjust the mass flow rate of the air flowing through the plurality of openings 174 to adjust (e.g., increase or decrease) the clearance or radial gap CL (FIG. 2) defined between the casing 112 (FIG. 2) and the blade tip 152 (FIG. 2) of each rotor blade 150 (FIG. 2) of the rotor 170.

When the movable member 410 is in the second position (FIGS. 10 and 12), each of the plurality of openings 412 defined by the movable member 410 can be aligned with a corresponding opening of the plurality of openings 174 in fluid communication with the cavity 172 of the rotor 170. In this manner, the movable member 410 no longer covers a portion of the plurality of openings 174. Furthermore, since the movable member 410 no longer covers a portion of the plurality of openings 174, air 200 can flow through the plurality of openings 174 at a second mass flow rate that is different than the first mass flow rate. In this manner, the movable member 410 can be used to vary the mass flow rate of air flowing into the cavity 172 of the rotor 170 via the plurality of openings 174 to adjust the clearance or radial gap CL defined between the casing 112 and the blade tip 152 of each rotor blade 150 of the rotor 170 as needed.

Figure 10:
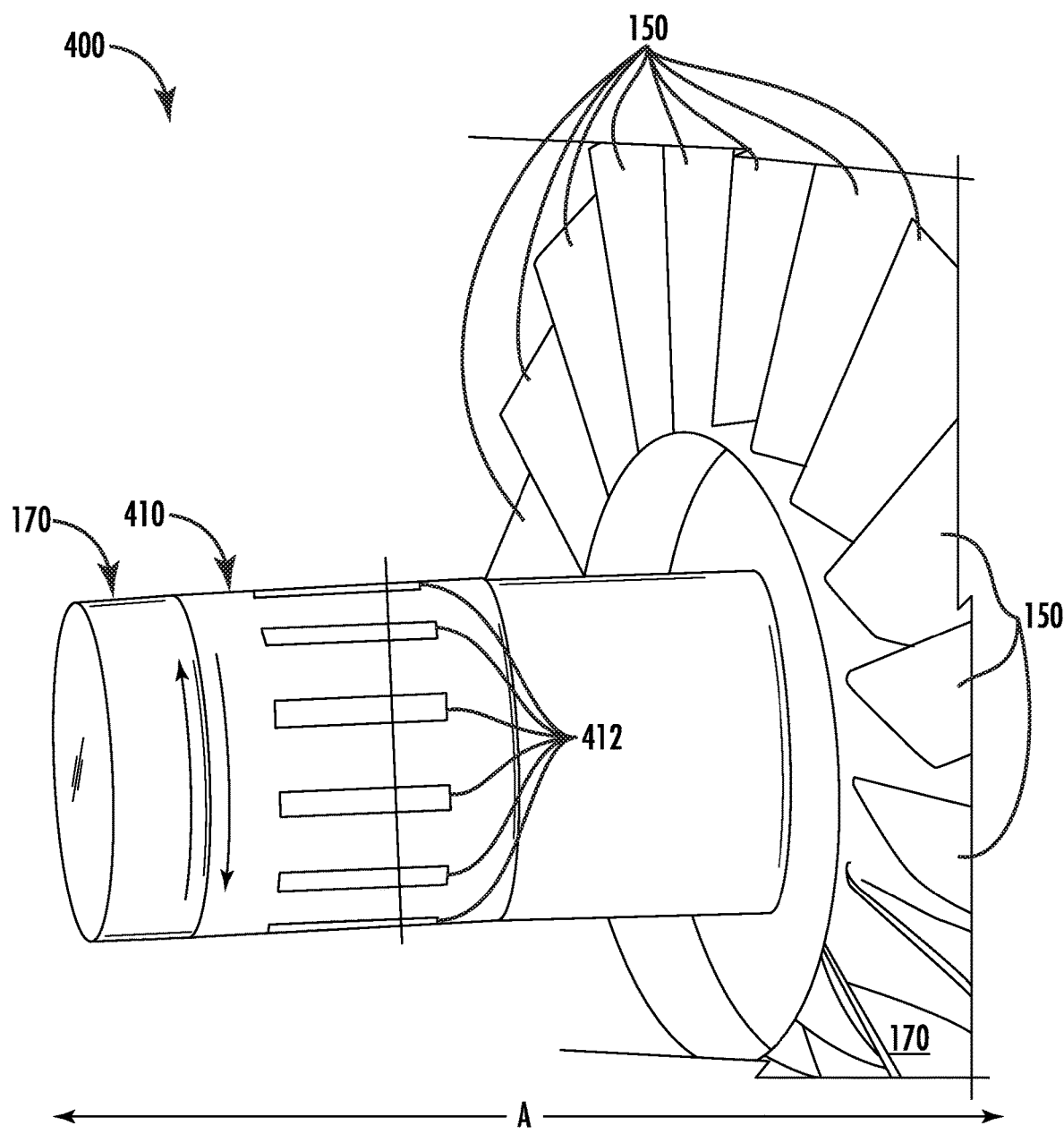
FIG. 10 depicts another view of the system of FIG. 9 according to example embodiments of the present disclosure.
Figure 11:
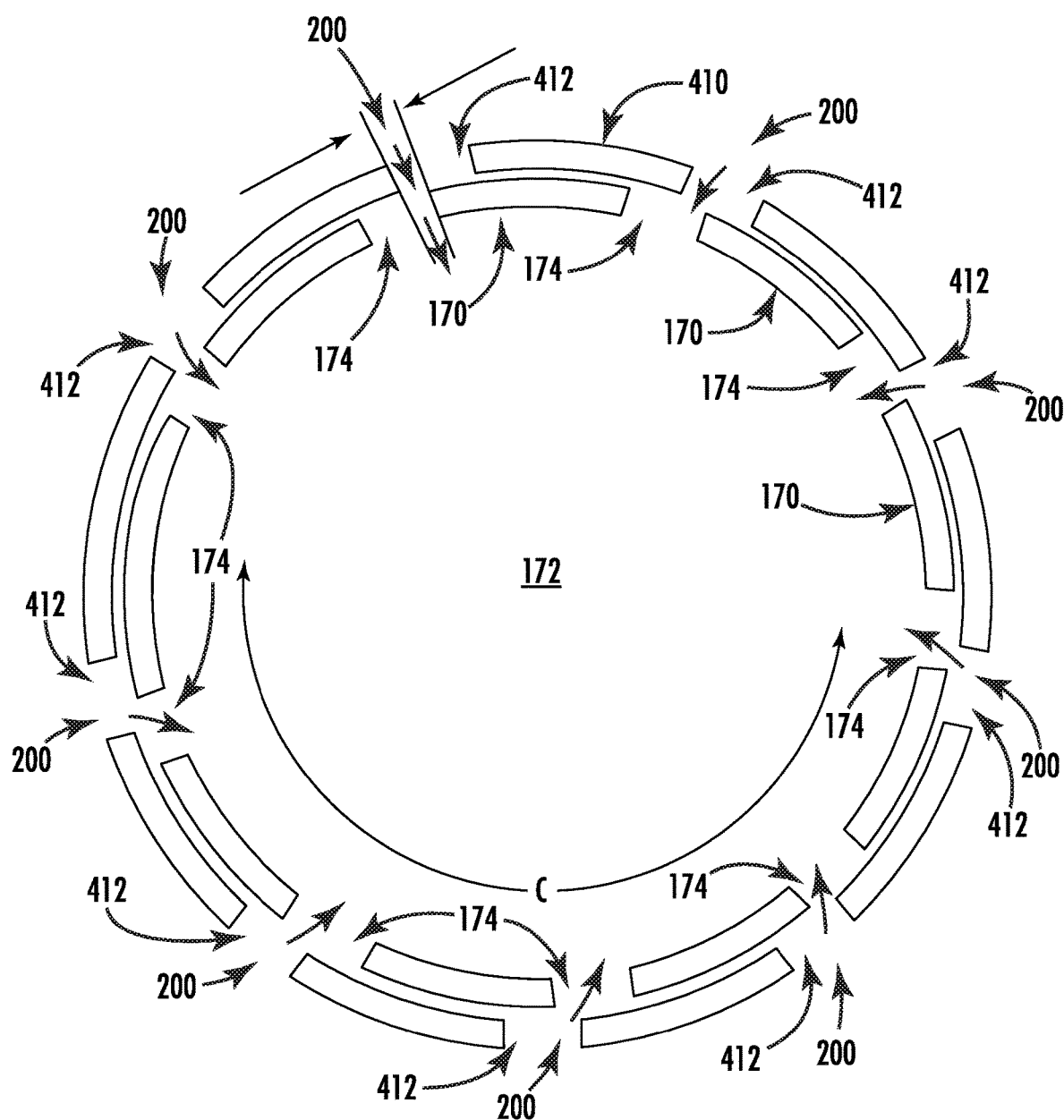
FIG. 11 depicts a cross-sectional view of a movable member of the system of FIG. 9 in a first position according to example embodiments of the present disclosure.
Figure 12:
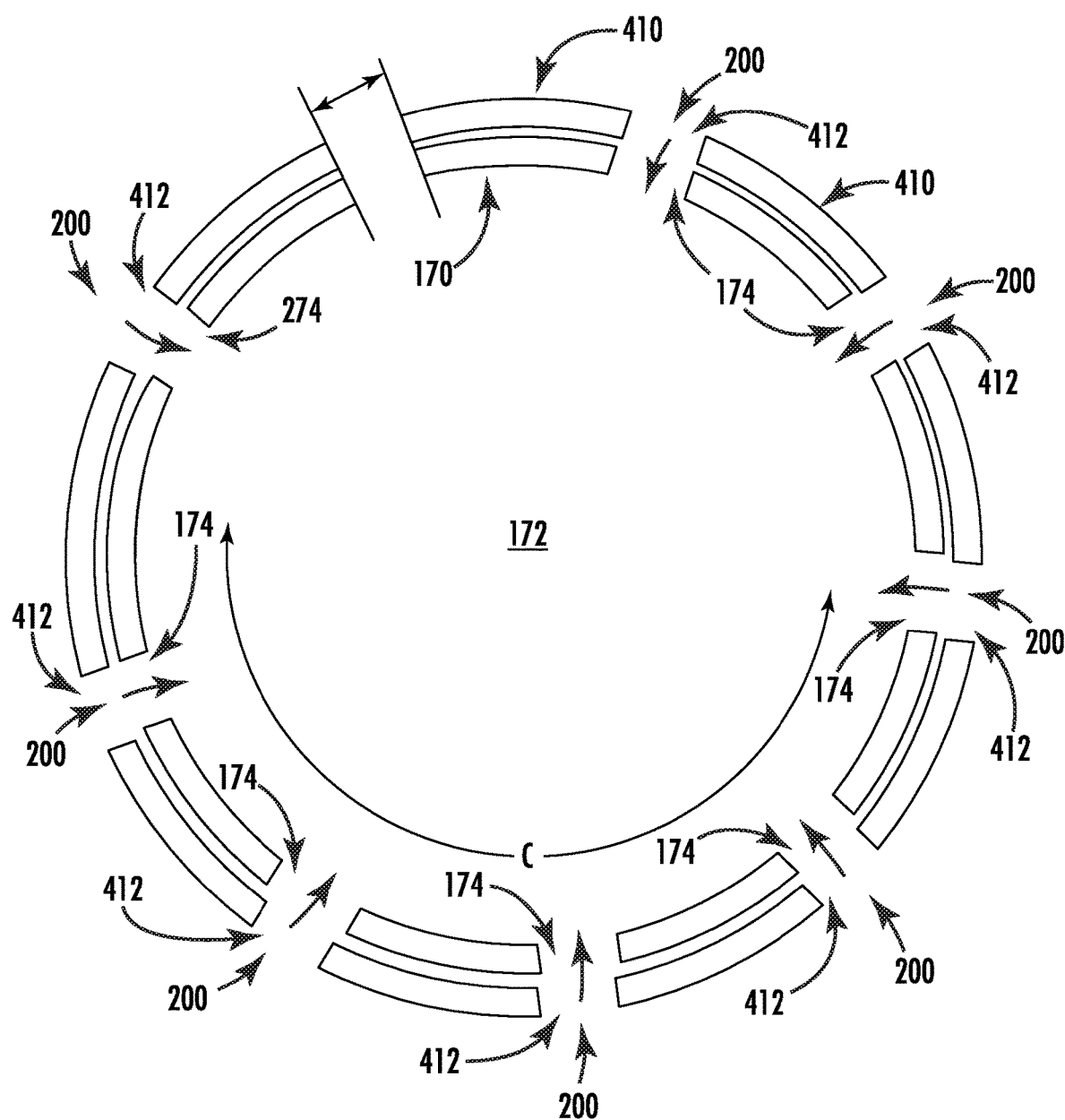
FIG. 12 depicts a cross-sectional view of a movable member of the system of FIG. 9 in a second position according to example embodiments of the present disclosure.
Figure 13:
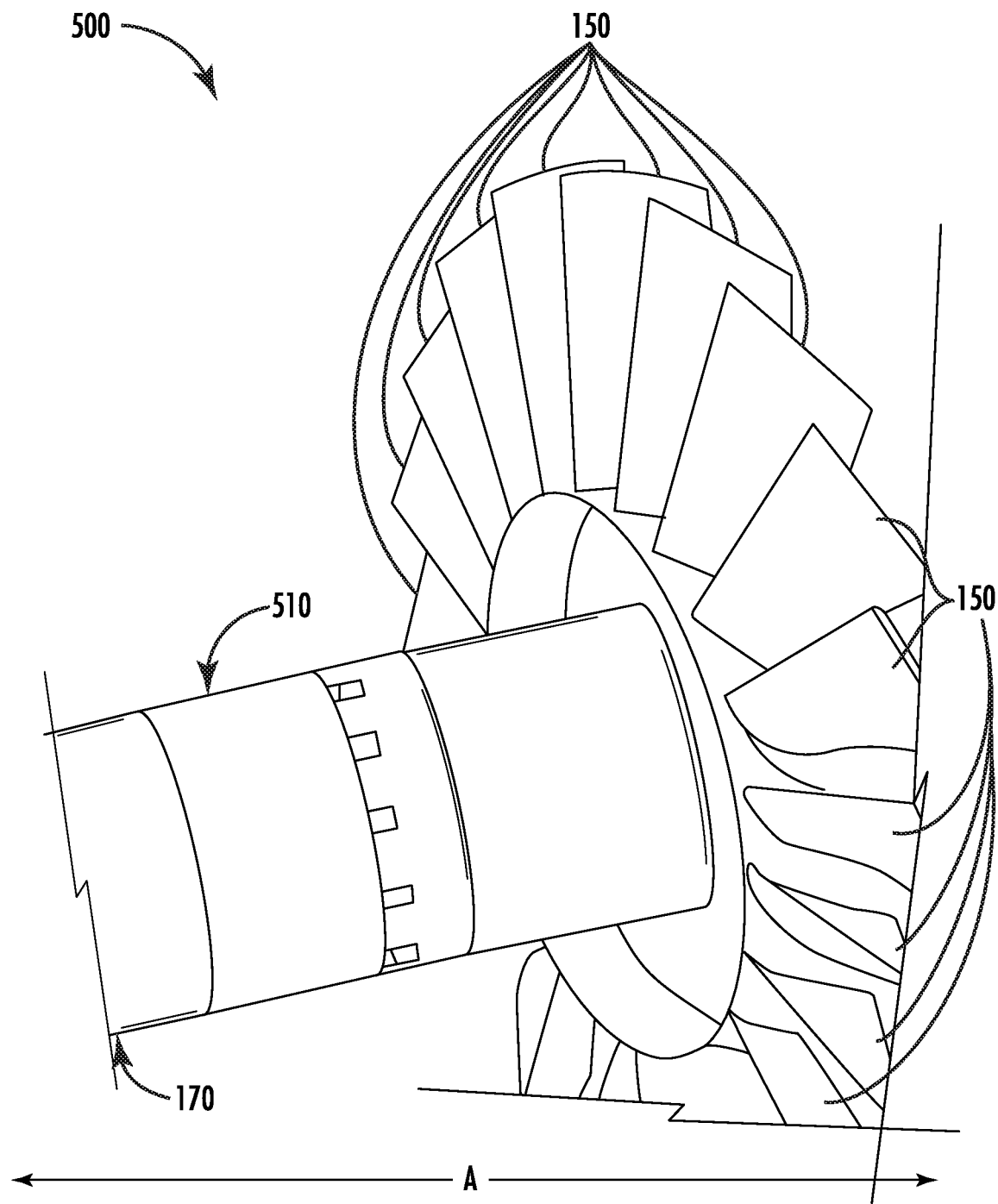
FIG. 13 depicts yet another system for modulating airflow into a bore of a rotor of a gas turbine engine according to example embodiments of the present disclosure.
Figure 14:
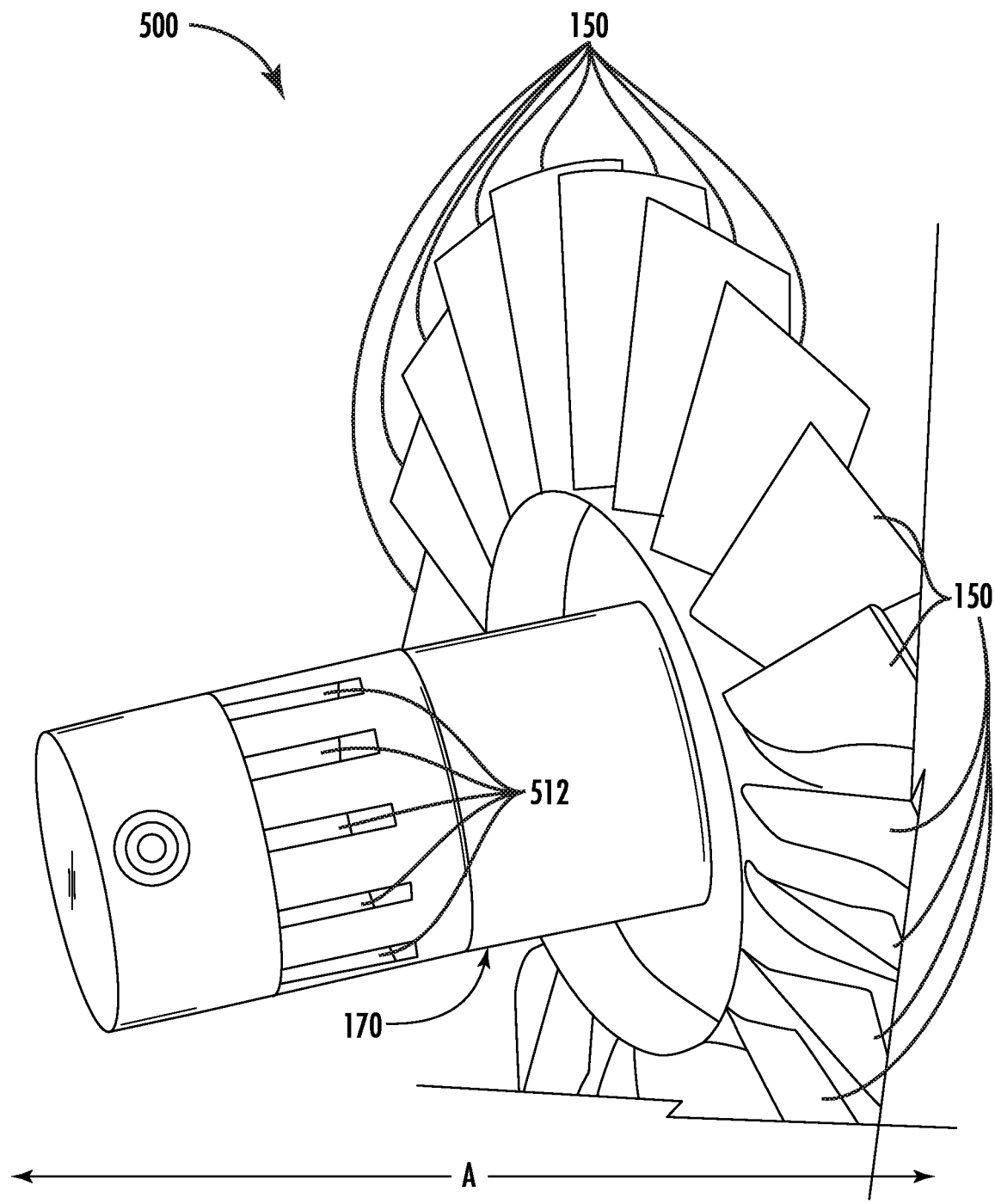
FIG. 14 depicts another system of FIG. 13 according to example embodiments of the present disclosure.
Figure 15:
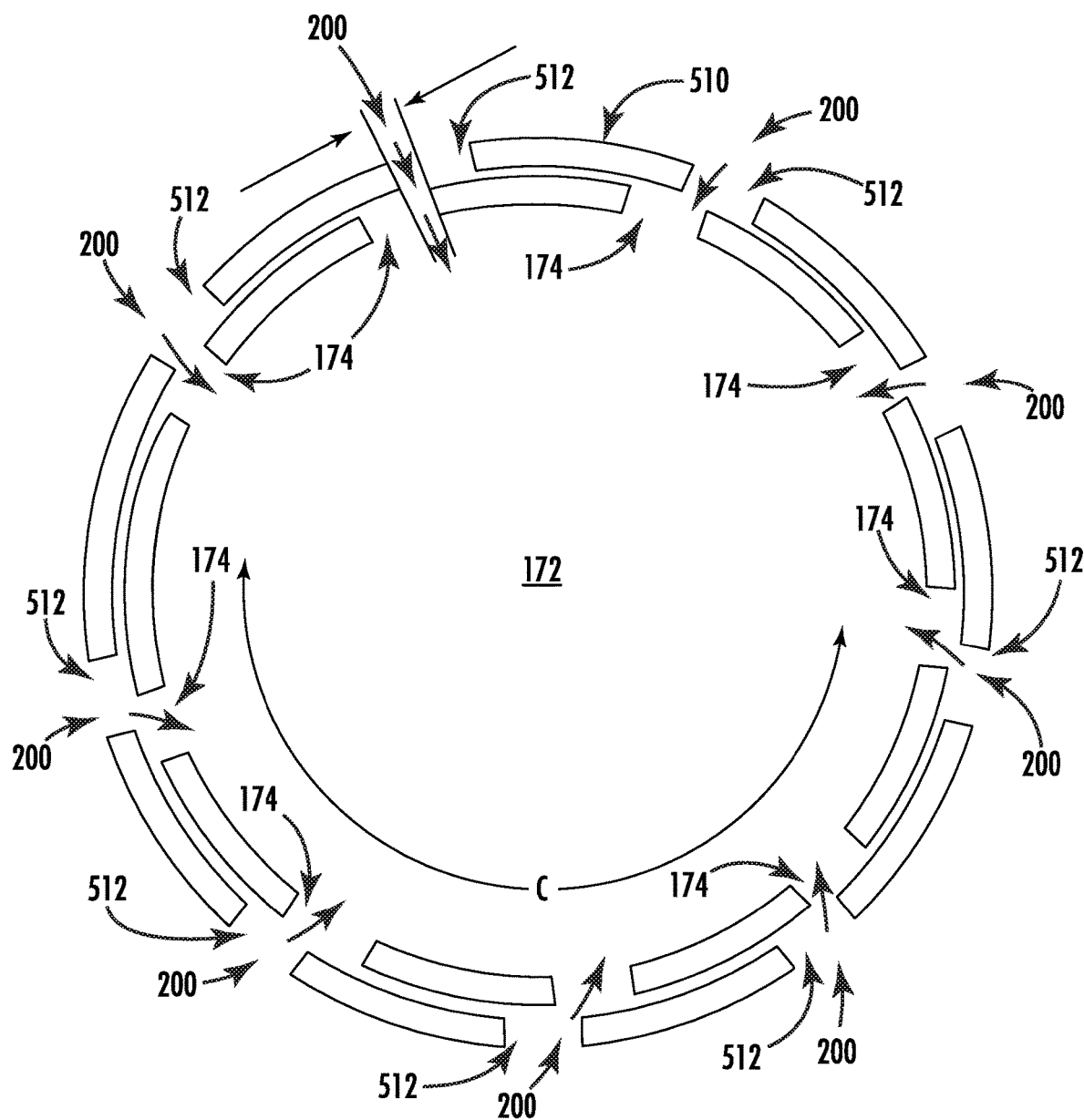
FIG. 15 depicts a cross-sectional view of a movable member of the system of FIG. 13 in a first position according to example embodiments of the present disclosure.
Figure 16:
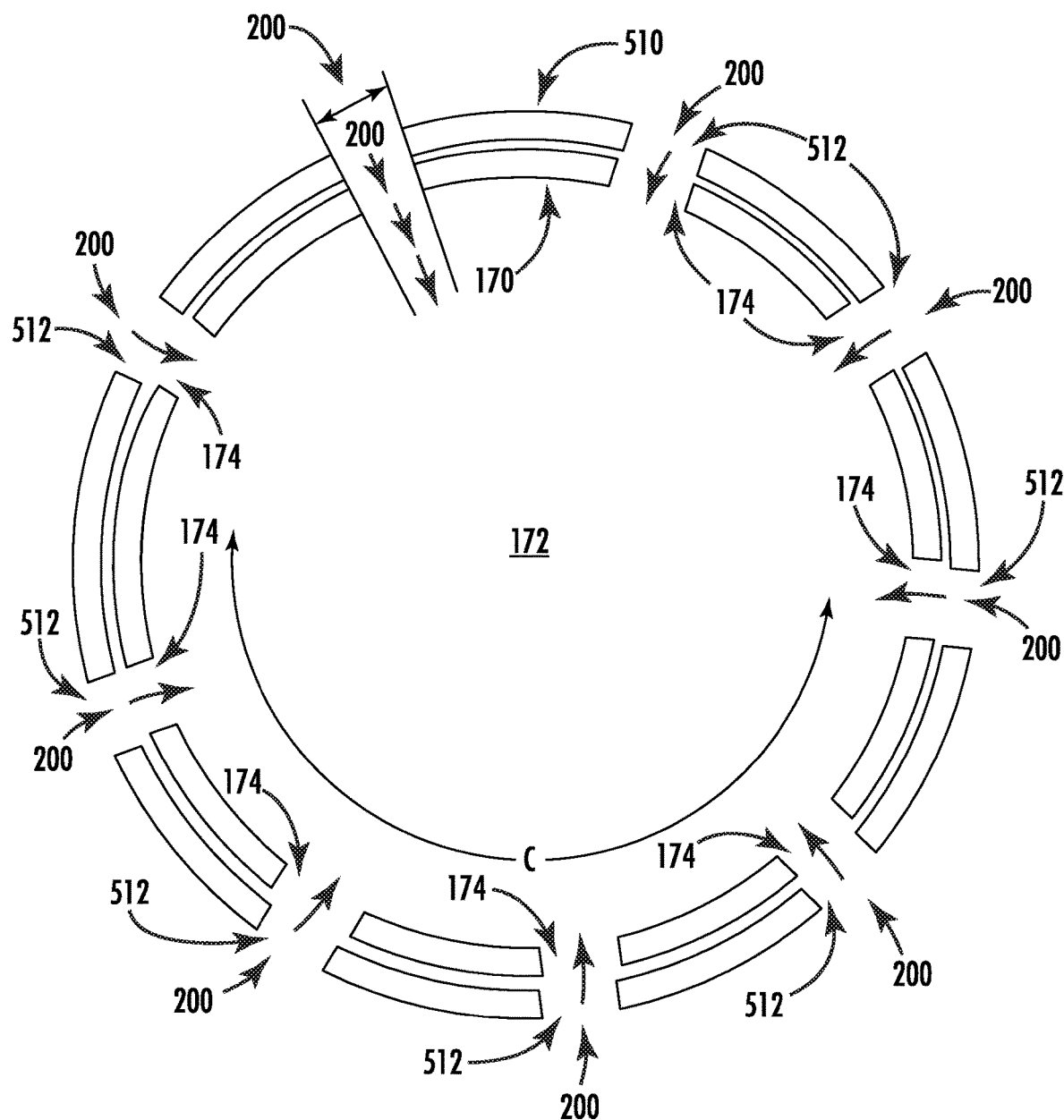
FIG. 16 depicts a cross-sectional view of a movable member of the system of FIG. 13 in a second position according to example embodiments of the present disclosure.

In some implementations, the system 400 can include one or more actuators (not shown) configured to move the movable member 410 between at least the first position (FIGS. 9 and 11) and the second position (FIGS. 10 and 12). For instance, the one or more actuators can be configured to rotate the movable member 410 along the circumferential direction C between at least the first position and the second position. Stated another way, the one or more actuators can be configured to rotate the movable member 410 about the axial direction A between at least the first position and the second position. In some implementations, the one or more actuators can include a rotary actuator.

Referring now to FIGS. 13 through 16, another system 500 is provided in accordance with the present disclosure. As shown, the system 500 can include a movable member 510. In some implementations, the movable member 510 can be a sleeve defining a plurality of openings 512. As will be discussed below in more detail, the movable member 510 can be movable along the axial direction A between at least a first position (FIGS. 13 and 15) and a second position (FIGS. 14 and 16) to modulate airflow into the cavity 172 (FIG. 2) of the rotor 170.

As shown, the movable member 510 can cover a portion of the each of the plurality of openings 174 when the movable member 510 is in the first position. In this manner, a surface area of each of the plurality of openings 174 through which air 200 flows to enter the cavity 172 of the rotor 170 is reduced when the movable member 510 is in the first position. As such, air 200 can flow through each of the plurality of openings 174 at a first mass flow rate when the movable member 510 is in the first position. As will be discussed below in more detail, the movable member 510 can move to the second position (FIGS. 10 and 12) to adjust the mass flow rate of the air flowing through the plurality of openings 174 to adjust (e.g., increase or decrease) the clearance or radial gap CL defined between the casing 112 (FIG. 2) and the blade tip 152 (FIG. 2) of each rotor blade 150 (FIG. 2) of the rotor 170.

When the movable member 510 is in the second position (FIGS. 10 and 12), each of the plurality of openings 512 defined by the movable member 510 can be aligned with a corresponding opening of the plurality of openings 174 in fluid communication with the cavity 172 of the rotor 170. In this manner the movable member 510 no longer covers a portion of the plurality of openings 174 when the movable member 510 is in the second position. Furthermore, since the movable member 510 no longer covers a portion of the plurality of openings 174, air 200 can flow through the corresponding opening at a second mass flow rate that is different than the first mass flow rate. In this manner, the movable member 510 can move between at least the first position and the second position to vary the mass flow rate of air flowing into the cavity 172 of the rotor 170 via the plurality of openings 174 to adjust the clearance or radial gap CL defined between the casing 112 and the blade tip 152 of each rotor blade 150 of the rotor 170 as needed.

In some implementations, the system 400 can include one or more actuators (not shown) configured to move the movable member 510 along the axial direction between at least the first position (FIGS. 9 and 11) and the second position (FIGS. 10 and 12). More specifically, the one or more actuators can be a linear actuator.

Figure 17:
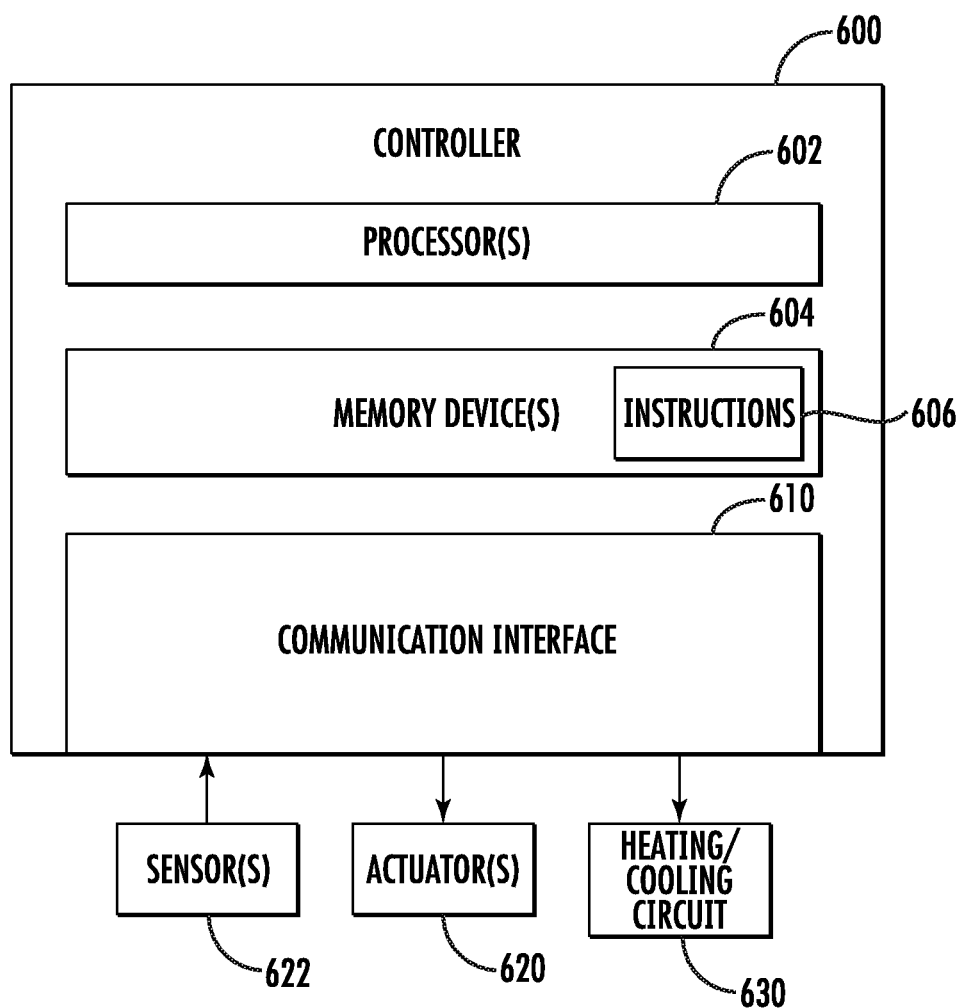
FIG. 17 depicts a block diagram of components of a controller of a system for modulating airflow into a bore of a rotor according to example embodiments of the present disclosure.

FIG. 17 illustrates one embodiment of suitable components that can be included within a controller 600 that can be used with the systems 300, 400, 500 disclosed above with reference to FIGS. 3-16. As shown, the controller 600 can include one or more processor 602 and one or more memory devices 604. The one or more memory devices 604 can be configured to store instructions 606 that, when executed by the one or processors 602, cause the one or more processors 602 to perform a variety of computer-implemented functions (e.g., performing the methods, steps, calculations and the like disclosed herein).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the one or more memory devices 604 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

Additionally, the controller 600 can also include a communications interface 610. In some implementations, the communications interface 610 can include associated electronic circuitry that is used to send and receive data. As such, the communications interface 610 of the controller 600 can be used to send and receive data to and from one or more actuators 620 configured to move the movable member 310, 410, 510 between at least the first position and the second position. In implementations in which the controller 600 is used with the system 300 discussed above with reference to FIGS. 3-8, the one or more actuators 620 can include the plurality of actuators 330 configured to rotate the plurality of flaps between at least the first position and the second position.

In addition, the communications interface 610 can also be used to communicate with any other suitable components of the turbofan 10, including any number of sensors 622 configured to monitor one or more operating parameters indicative of operation of the turbofan 10 or the environment in which the turbofan 10 is operating. It should be appreciated that the communications interface 610 can be any combination of suitable wired and/or wireless communications interfaces and, thus, may be communicatively coupled to one or more components of the turbofan 10 via a wired and/or wireless connection.

In implementations in which the movable member 310 (FIG. 3) includes the plurality of flaps, the controller 600 can be configured to independently control each of the plurality of flaps based, at least in part, on data indicative of one or more parameters associated with operation of the turbofan 10 (FIG. 1). For example, the data can be indicative of a speed at which the plurality of fan blades 40 (FIG. 1) of the fan section 14 of the turbofan 10 are rotating. Alternatively or additionally, the data can be indicative of one or more parameters associated with an environment in which the turbofan 10 is operating. For instance, examples of the one or more parameters associated with the environment can include, without limitation, an altitude at which the turbofan 10 is operating, an ambient pressure associated with the environment, or both. It should be understood that the controller 600 can be configured to move the movable member 310 (e.g., one or more of the plurality of flaps) between at least the first position and the second position based on the data.

In some implementations, the controller 600 can be configured to control operation of a heating and/or cooling circuit 630 to heat or cool the air 200 (FIG. 2) flowing into the cavity 172 (FIG. 2) of the rotor 170 via the plurality of openings 174. In this manner, the controller 600 can heat or cool the air 200 via the heating and/or cooling circuit 630 to heat or cool the rotor 170 as needed to adjust radial deflection of the rotor blades 150 and thereby adjust the clearance gap CL (FIG. 2). In some implementations, the controller 600 can be configured to control operation of the heating and/or cooling circuit based, at least in part, on data indicative of a temperature within the cavity 172 of the rotor. For instance, the controller 600 can be configured to obtain the data indicative of the temperature within the cavity 172 of the rotor 170 via one or more temperature sensors positioned within the cavity 172.

Figure 18:
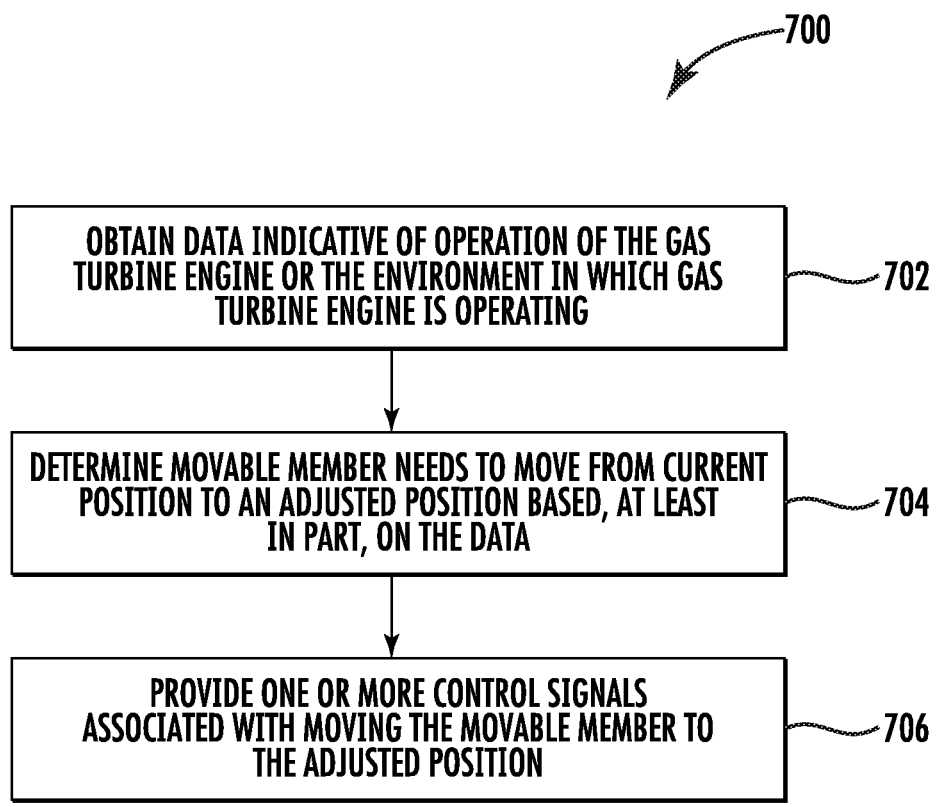
FIG. 18 depicts a flow diagram of a method for modulating airflow into a bore of a rotor according to example embodiments of the present disclosure.

Referring now to FIG. 18, a flow diagram of a method 700 for modulating airflow into a bore of a rotor is provided according to example embodiments of the present disclosure. The method 700 can be implemented, for instance, using the controller discussed above with reference to FIG. 17. FIG. 18 depicts steps performed in a particular order for purposes of illustration and discussion. Those of ordinary skill in the art, using the disclosures provided herein, will understand that various steps of any of the methods described herein, will understand that various steps of any of the methods described herein can be adapted, expanded, omitted, rearranged, performed simultaneously, and/or modified in various ways without deviating from the scope of the present disclosure.

At (702), the method 700 can include obtaining, by one or more processors, data indicative of one or more parameters associated with operation of the gas turbine engine or an environment in which the gas turbine engine is operating. In some implementations, the data can be indicative of a speed at which the fan blades 40 (FIG. 1) of the fan section 14 of the turbofan 10 are operating. Alternatively or additionally, the data can be indicative of an ambient pressure and/or ambient temperature associated with the environment in which the turbofan is operating.

At (704), the method 700 can include determining, by the one or more processors, a movable member movable between at least a first position and a second position to modulate airflow into the bore of the rotor via the plurality of openings needs to move from a current position to an adjusted position based, at least in part, on the data.

In some implementations, the current position of the movable member can correspond to the first position in which movable member covers at least a portion of the plurality of openings in fluid communication with the bore of the rotor. In addition, the adjusted position can correspond to the second position of the movable member in which the movable member does not cover the one or more openings in fluid communication with the bore of the rotor.

In alternative implementations, the current position of the movable member can correspond to the second position of the movable member in which the movable member does not cover the one or more openings in fluid communication with the bore of the rotor. In addition, the adjusted position can correspond to the first position in which the movable member covers at least a portion of the plurality of openings in fluid communication with the bore of the rotor.

At (706), the method 700 can include providing, by the one or more processors, one or more control signals associated with controlling operation of the movable member such that the movable member moves from the current position to the adjusted position In some implementations, providing the one or more control signals can include providing, by the one or more processors, the one or more control signals to one or more actuators configured to move the movable member between at least the first position and the second position. In this manner, the one or more actuators can, upon receiving the one or more control signals, move the movable member from its current position to the adjusted position.

Although the systems 300, 400, 500 are discussed above with reference to the turbofan 10 depicted in FIG. 1, it should be appreciated that the system 300, 400, 500 can be implemented on any suitable type of gas turbine engine. For instance, in some implementations, the system 300, 400, 500 can be implemented on a turboshaft gas turbine engine.

Further aspects of the invention are provided by the subject matter of the following clauses:

1. A system for modulating airflow into a bore defined by a rotor of a gas turbine engine defining an axial direction, a circumferential direction, and a radial direction, the system comprising a movable member positioned forward of a first stage of rotor blades of the rotor, the movable member movable between at least a first position and a second position to modulate airflow into the bore via a plurality of openings in fluid communication with the bore.

2. The system of any preceding aspect, wherein the movable member comprises a valve. The valve may be movable between at least the first position and the second position to modulate airflow into the cavity.

3. The system of any preceding aspect, wherein the movable member comprises a plurality of flaps spaced apart from one another along the circumferential direction, each of the plurality of flaps rotatable between at least the first position and the second position.

4. The system of any preceding aspect, further comprising a plurality of actuators, each of the plurality of actuators configured to rotate a corresponding flap of the plurality of flaps between at least the first position and the second position.

5. The system of any preceding aspect, wherein when a flap of the plurality of flaps is in the first position, the flap is oriented in a first plane. Furthermore, when the flap is in the second position, the flap is oriented in a second plane that is different than the first plane.

6. The system of any preceding aspect, wherein when the flap is in the first position, the flap is spaced apart from a corresponding opening of the plurality of openings along the radial direction.

7. The system of any preceding aspect, wherein when the flap is in the first position, the flap covers a portion of a corresponding opening of the plurality of openings such that air flows through the corresponding opening at a first mass flow rate. Furthermore, when the flap is in the second position, air flows through the corresponding opening at second mass flow rate that is different than the first mass flow rate.

8. The system of any preceding aspect, wherein the movable member comprises a sleeve defining a plurality of openings, the sleeve rotatable along the circumferential direction between at least the first position and the second position.

9. The system of any preceding aspect, further comprising one or more rotary actuators configured to rotate the sleeve along the circumferential direction between at least the first position and the second position.

10. The system of any preceding aspect, wherein when the sleeve is in the first position, each of the plurality of openings defined by the sleeve is aligned with a corresponding opening of the plurality of openings in fluid communication with the bore defined by the rotor. Furthermore, when the sleeve is in the second position, the sleeve covers at least a portion of the plurality of openings in fluid communication with the bore defined by the rotor.

11. The system of any preceding aspect, wherein when the sleeve is in the first position, air flows into the bore via the plurality of openings at a first mass flow rate. Furthermore, when the sleeve is in the second position, air flows into the bore via the plurality of openings at a second mass flow rate that is different than the first mass flow rate.

12. The system of claim 1, wherein the movable member comprises a sleeve defining a plurality of openings, the sleeve movable along the axial direction between at least the first position and the second position.

13. The system of any preceding aspect, further comprising a linear actuator configured to move the sleeve along the axial direction between at least the first position and the second position.

14. A gas turbine engine defining an axial direction, a circumferential direction, and a radial direction, the gas turbine engine comprising a low pressure compressor drivingly coupled to a low pressure turbine of the gas turbine engine via a low pressure shaft. The gas turbine engine further comprising a high pressure compressor drivingly coupled to a high pressure turbine of the gas turbine engine via high pressure shaft. The high pressure compressor comprising a rotor defining a bore and a plurality of openings in fluid communication with the bore. The gas turbine engine further comprising a movable member positioned forward of a first stage of rotor blades of the rotor, the movable member movable between at least a first position and a second position to modulate airflow into the bore of the rotor via the plurality of openings.

15. The gas turbine engine of any preceding aspect, wherein the plurality of openings are positioned forward of a first stage of rotor blades of the rotor.

16. The gas turbine engine of any preceding aspect, wherein the plurality of openings are spaced apart from one another along the circumferential direction.

17. The gas turbine engine of any preceding aspect, wherein the movable member comprises a plurality of flaps spaced apart from one another along the circumferential direction. Furthermore, each of the plurality of flaps is rotatable between at least the first position and the second position.

18. A method for modulating airflow into a bore of a rotor of a gas turbine engine is provided. The method includes obtaining, by one or more processors, data indicative of one or more parameters associated with operation of the gas turbine engine or an environment in which the gas turbine engine is operating. The method includes determining, by the one or more processors, a movable member movable between at least a first position and a second position to modulate airflow into the bore of the rotor needs to move from a current position to an adjusted position based, at least in part, on the data. The method includes providing, by the one or more processors, one or more control signals associated with controlling operation of the movable member such that the movable member moves from the current position to the adjusted position.

19. The method of any preceding aspect, wherein when the movable member is in the current position, the movable member covers at least a portion of a plurality of openings in fluid communication with the bore of the rotor such that air flows through the plurality of openings at a first mass flow rate. Furthermore, when the movable member is in the adjusted position, air flows through the plurality of openings at a second mass flow rate that is different than the first mass flow rate.

20. The method of any preceding aspect, wherein providing one or more control signals associated with controlling operation of the movable member such that the movable member moves from the current position to the adjusted position comprises providing, by the one or more processors, the one or more control signals to one or more actuators configured to move the movable member between at least the first position and the second position.

What is claimed is:

1. A system for modulating airflow into a bore defined by a rotor of a gas turbine engine defining an axial direction, a circumferential direction, and a radial direction, the system comprising:
a movable member positioned on the rotor forward of a first stage of rotor blades of the rotor, the movable member movable between at least a first position and a second position to modulate airflow into the bore via a plurality of openings in fluid communication with the bore,
wherein the movable member comprises a sleeve defining the plurality of openings, the sleeve rotatable along the circumferential direction between at least the first position and the second position or movable along the axial direction between at least the first position and the second position.

2. The system of claim 1, wherein the sleeve is rotatable along the circumferential direction between at least the first position and the second position, wherein the system comprises one or more rotary actuators configured to rotate the sleeve along the circumferential direction between at least the first position and the second position.

3. The system of claim 1, wherein:
when the sleeve is in the first position, each of the plurality of openings defined by the sleeve is aligned with a corresponding opening of the plurality of openings in fluid communication with the bore defined by the rotor; and
when the sleeve is in the second position, the sleeve covers at least a portion of the plurality of openings in fluid communication with the bore defined by the rotor.

4. The system of claim 3, wherein:
when the sleeve is in the first position, air flows into the bore via the plurality of openings at a first mass flow rate; and
when the sleeve is in the second position, air flows into the bore via the plurality of openings at a second mass flow rate that is different than the first mass flow rate.

5. The system of claim 1, wherein the sleeve is movable along the axial direction between at least the first position and the second position, wherein the system comprises a linear actuator configured to move the sleeve along the axial direction between at least the first position and the second position.

6. The system of claim 1, wherein the sleeve is movable along the axial direction between at least the first position and the second position.

7. The system of claim 1, wherein the sleeve is rotatable along the circumferential direction between at least the first position and the second position.

8. The system of claim 1, wherein the plurality of openings are in fluid communication with a heating and/or cooling circuit.

9. The system of claim 8, wherein the movable member is configured to modulate heated and/or cooled air flowing into the bore of the rotor via the plurality of openings.

10. A gas turbine engine defining an axial direction, a circumferential direction, and a radial direction, the gas turbine engine comprising:
a low pressure compressor drivingly coupled to a low pressure turbine of the gas turbine engine via a low pressure shaft;
a high pressure compressor drivingly coupled to a high pressure turbine of the gas turbine engine via a high pressure shaft, the high pressure compressor comprising a rotor defining a bore and a plurality of openings in fluid communication with the bore; and
a movable member positioned forward of a first stage of rotor blades of the rotor, the movable member movable between at least a first position and a second position to modulate airflow into the bore of the rotor via the plurality of openings,
wherein the plurality of openings are spaced apart from one another along the circumferential direction, and
wherein the movable member comprises a plurality of flaps spaced apart from one another along the circumferential direction, each of the plurality of flaps rotatable about the axial direction between at least the first position and the second position.

11. The gas turbine engine of claim 10, wherein the plurality of openings are positioned forward of the first stage of rotor blades of the rotor.

12. The gas turbine engine of claim 10, wherein the movable member is disposed on the rotor.

13. A system for modulating airflow into a bore defined by a rotor of a high pressure compressor of a gas turbine engine, the gas turbine engine defining an axial direction, a circumferential direction, and a radial direction, the system comprising:
a movable member positioned on the rotor forward of a first stage of rotor blades of the rotor, the movable member movable between at least a first position and a second position to modulate airflow into the bore via a plurality of openings in fluid communication with the bore,
wherein the plurality of openings are spaced apart from one another along the circumferential direction, and
wherein the movable member comprises a plurality of flaps spaced apart from one another along the circumferential direction, each of the plurality of flaps rotatable about the axial direction between at least the first position and the second position.

14. The system of claim 13, wherein the plurality of openings are positioned forward of the first stage of rotor blades of the rotor.

15. The system of claim 13, further comprising:
a plurality of actuators, each of the plurality of actuators configured to rotate a corresponding flap of the plurality of flaps about the axial direction between at least the first position and the second position.

16. The system of claim 13, wherein:
when a flap of the plurality of flaps is in the first position, the flap is oriented in a first plane; and
when the flap is in the second position, the flap is oriented in a second plane that is different than the first plane.

17. The system of claim 16, wherein when the flap is in the first position, the flap is spaced apart from a corresponding opening of the plurality of openings along the radial direction.

18. The system of claim 16, wherein:
when the flap is in the first position, the flap covers a portion of a corresponding opening of the plurality of openings such that air flows through the corresponding opening at a first mass flow rate; and
when the flap is in the second position, air flows through the corresponding opening at a second mass flow rate that is different than the first mass flow rate.

19. The system of claim 13, wherein the plurality of openings are in fluid communication with a heating and/or cooling circuit.

\* \* \* \* \*